(12) United States Patent
Azuma et al.

(10) Patent No.: US 7,567,118 B2
(45) Date of Patent: Jul. 28, 2009

(54) BOOSTER CIRCUIT

(75) Inventors: Ryotaro Azuma, Kyoto (JP); Makoto Kojima, Suita (JP)

(73) Assignee: Panasonic Corporation, Osaka (JP)

( * ) Notice: Subject to any disclaimer, the term of this patent is extended or adjusted under 35 U.S.C. 154(b) by 27 days.

(21) Appl. No.: 11/093,023

(22) Filed: Mar. 30, 2005

(65) Prior Publication Data

US 2005/0218966 A1    Oct. 6, 2005

(30) Foreign Application Priority Data

Mar. 31, 2004    (JP)    ............................. 2004-105052

(51) Int. Cl.
     *G05F 1/10*      (2006.01)
     *G05F 3/02*      (2006.01)

(52) U.S. Cl. ..................................... 327/536

(58) Field of Classification Search ................ 327/536, 327/589; 363/59–60

See application file for complete search history.

(56) References Cited

U.S. PATENT DOCUMENTS

| | | | |
|---|---|---|---|
| 5,959,854 | A | 9/1999 | Okada |
| 6,259,612 | B1 * | 7/2001 | Itoh ............................ 363/60 |
| 6,456,153 | B2 * | 9/2002 | Buck et al. ................. 327/536 |
| 6,597,235 | B2 | 7/2003 | Choi |
| 6,878,981 | B2 * | 4/2005 | Eshel .......................... 257/299 |
| 7,042,275 | B2 * | 5/2006 | Suwa et al. ................ 327/536 |
| 2002/0125935 | A1 * | 9/2002 | Sawada et al. ............. 327/536 |
| 2003/0122612 | A1 * | 7/2003 | Kawai et al. ............... 327/536 |
| 2004/0095806 | A1 | 5/2004 | Osawa et al. |
| 2005/0035811 | A1 * | 2/2005 | Shin ........................... 327/536 |

FOREIGN PATENT DOCUMENTS

| | | |
|---|---|---|
| JP | 09-297997 | 11/1997 |
| JP | 11-025673 | 1/1999 |
| JP | 2000-331489 | 11/2000 |
| JP | 2000331489 A | * 11/2000 |

OTHER PUBLICATIONS

Japanese Office Action issued in Patent Application No. JP 2004-105052 dated on Jul. 4, 2008.

* cited by examiner

*Primary Examiner*—Quan Tra
(74) *Attorney, Agent, or Firm*—McDermott Will & Emery LLP

(57) ABSTRACT

An oscillation circuit 10 outputs oscillation clocks 100 different in phase, and a four-phase clock generation circuit 20 generates a four-phase clock 200 based on a difference in phase between the oscillation clocks 100. A four-phase clock transfer control circuit 50 controls whether to transfer the four-phase clock 200 in accordance with a signal CP_EN, and a pump circuit 60 generates a boosted voltage based on the transferred four-phase clock. A time period of delay Tos between clocks included in the four-phase clock 200 is generated based on the difference in phase between the oscillation clocks 100, and therefore always in a proportional relationship with a cycle (Tosc) of the oscillation clocks 100. Accordingly, even if the cycle (Tosc) is changed due to operating conditions, and therefore a time period of charge transfer (Ttr) can be uniquely determined.

7 Claims, 17 Drawing Sheets

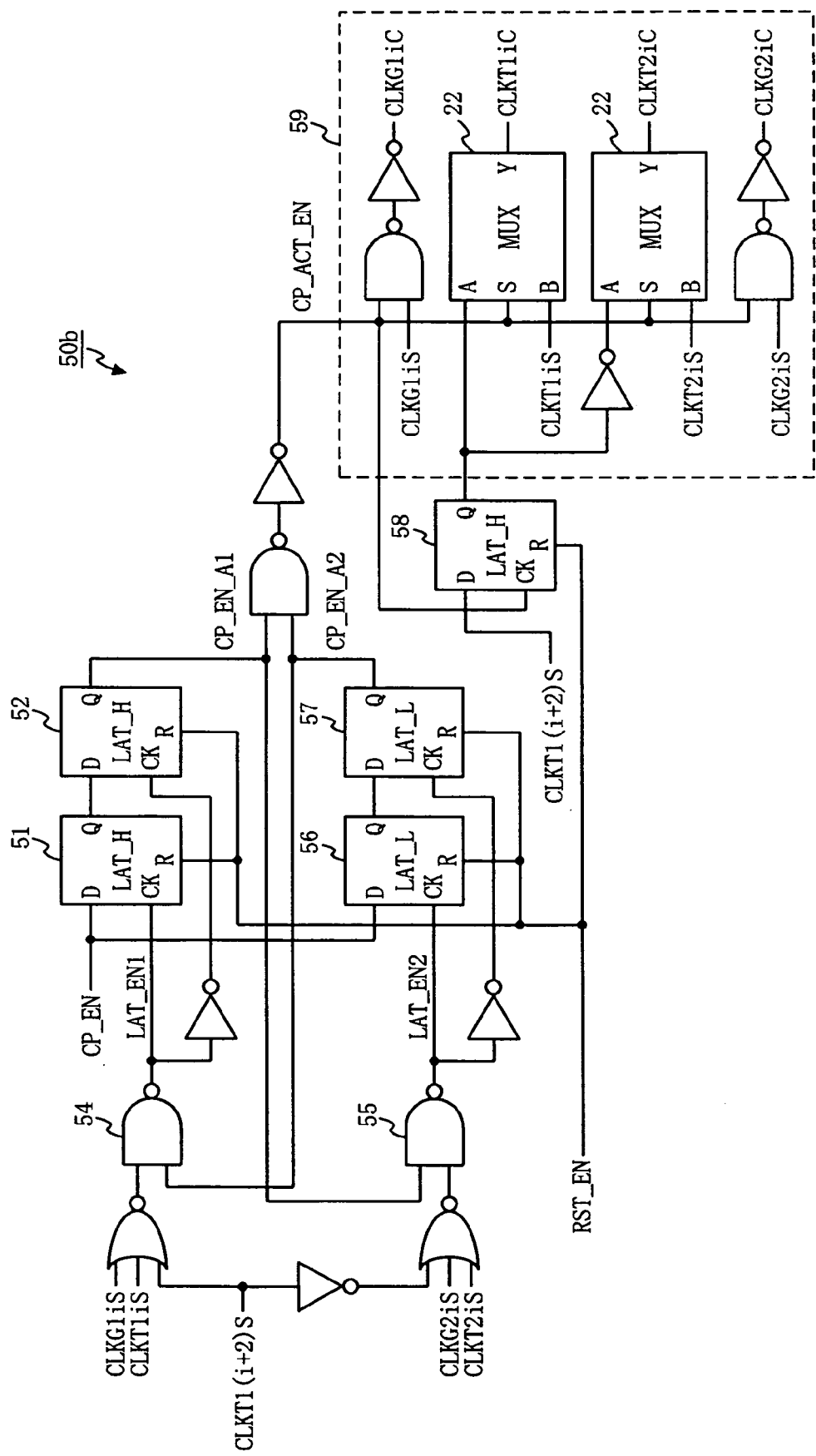
F I G. 7

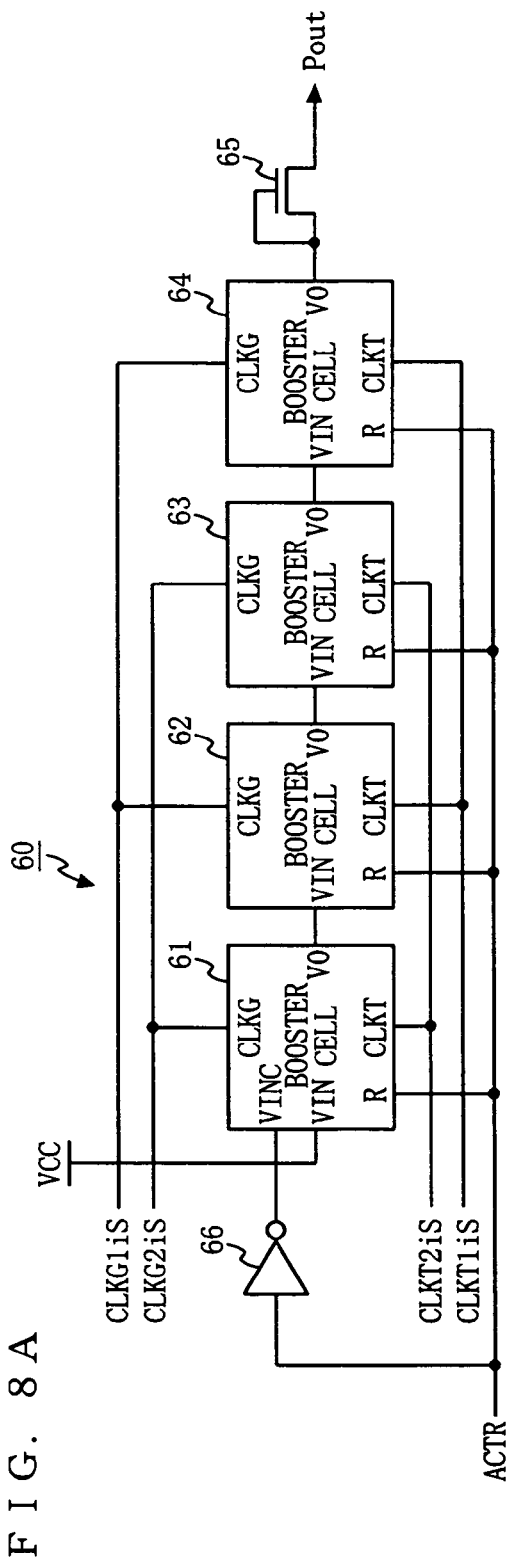
FIG. 8A
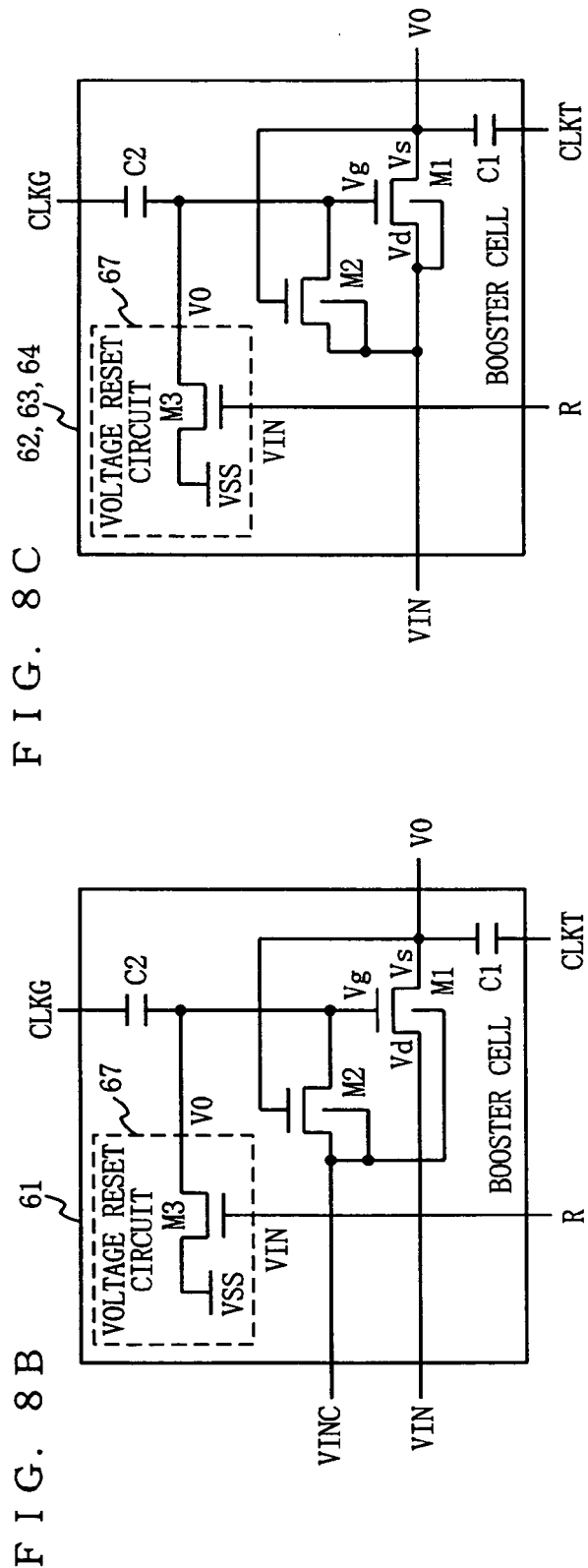
FIG. 8B
FIG. 8C

BOOSTER CIRCUIT

BACKGROUND OF THE INVENTION

1. Field of the Invention

The present invention relates to a booster circuit, and more particularly to a booster circuit included in a semiconductor integrated circuit and operating based on a multiphase clock.

2. Description of the Background Art

A nonvolatile memory, such as a flash EEPROM, or a microcomputer including such a memory requires a voltage higher than an externally-supplied power supply voltage in order to perform erase/program operations (hereinafter, collectively referred to as a "rewrite operation") or a read operation on the nonvolatile memory. The voltage required for such operations is supplied from a booster circuit included in the nonvolatile memory or the like and generating a plurality of boosted voltages. As the booster circuit, a four-phase clock driven threshold balancing-type booster circuit, which is operable at a low voltage level to effectively boost the voltage level, is widely used.

FIG. 16 is a diagram illustrating the configuration of a conventional four-phase clock driven booster circuit. The booster circuit shown in FIG. 16 includes a first booster block 48 for generating a voltage Pout1 higher than a power supply voltage, and a second booster block 49 for generating a voltage Pout2 higher than the voltage Pout1. The first booster block 48 includes an oscillation circuit 10, a plurality of four-phase clock generation circuits 29, pump circuits 69, the number of which is equal to the number of four-phase clock generation circuits 29, and a detection circuit 70. The second booster block 49 is configured in a manner similar to the first booster block 48.

Each circuit included in the first booster block 48 operates as described below. The oscillation circuit 10 outputs a plurality of oscillation clocks 100 different in phase from each other. The four-phase clock generation circuits 29 each generate a four-phase clock 209, which is composed of four clocks different in phase from each other, based on one of the oscillation clocks 100 (e.g., OSC1). The pump circuits 69 each generate a voltage Pout1, which is higher than a power supply voltage, based on the four-phase clock 209 generated by one of the four-phase clock generation circuits 29. In order to control the voltage Pout1 outputted from the pump circuits 69 so as to become predetermined voltage (hereinafter, referred to as "target voltage"), the detection circuit 70 controls on/off operations of the oscillation circuit 10 based on the level of the voltage Pout1. In the detection circuit 70, the target voltage is switched between, for example, high and low levels in accordance with a voltage setting signal ACTH.

The oscillation circuit 10 includes, for example, a ring oscillator in which one NAND gate and an even number of inverters are connected to form a ring (see FIG. 2 which will be described later). The four-phase clock generation circuits 29 are each, for example, a circuit in which inverters and selection circuits 22 are connected together as shown in FIG. 17. The selection circuits 22 each output input A when input S is at a low (L) level, and input B when the input S is at a high (H) level (see FIG. 4 which will be described later). The four-phase clock generation circuits 29 each include delay circuits 28, each being composed of a plurality of inverters connected in series with each other. A time period of delay caused in each of the delay circuits 28 is assumed to be Tcs.

The pump circuits 69 are each, for example, a circuit in which four booster cells 68 and 62-64 are connected in series with each other as shown in FIG. 18A. The booster cell 64 in the last stage has an output terminal connected to a rectifier transistor 65. As shown in FIG. 18A, each of the booster cells 68 and 62-64 is coupled to and driven by two clocks in the four-phase clock 209 generated by one of the four-phase clock generation circuits 29.

The booster cells 68 and 62-64 are booster cells of a type as shown in FIG. 18B, for example. The booster cells 68 and 62-64 each include an N-channel charge transfer transistor M1, an N-channel switch transistor M2, booster capacitors C1 and C2, and a voltage reset circuit 67. The voltage reset circuit 67 cause a gate terminal of the charge transfer transistor M1 and a ground terminal to become nonconductive when a voltage resetting signal ACTR inputted from an R terminal is inactive, and causes both of the terminals to become conductive when the signal is active. Thus, when the voltage resetting signal ACTR becomes active, a gate voltage Vg applied across the charge transfer transistor M1 is reset to a ground voltage VSS. Such a voltage reset circuit 67 is realized by an NMOS transistor M3 in which a source terminal is grounded, a drain terminal is connected to the gate terminal of the charge transfer transistor M1, and the voltage resetting signal ACTR is applied to a gate terminal.

Referring to FIG. 19, a four-phase clock generation method for use in the conventional booster circuit as configured in the above-described manner is described. The oscillation circuit 10 starts operating when the level of a clock enable signal CP_EN inputted from an EN terminal becomes "H", and sequentially outputs, as oscillation clocks 100, n signals OSC1 to OSCn so as to be delayed in increments of a predetermined period of time (a time period of delay Tos shown in FIG. 19).

In an i'th four-phase clock generation circuit 29 as shown in FIG. 17 (where i is an integer in the range of 1 to n), when a signal OSCi outputted from the oscillation circuit 10 falls, a clock CLKG1iS falls. Upon the fall of the clock CLKG1iS, a clock CLKT1iS rises. After a time period of delay Tcs since the rise of the clock CLKT1iS, which is caused by the delay circuit 28, a clock CLKT2iS falls. Upon the fall of the clock CLKT2iS, a clock CLKG2iS rises. After a lapse of a time period of charge transfer Ttr, the clock OSCi rises, and the clock CLKG2iS falls. Upon the fall of the clock CLKG2iS, the clock CLKT2iS rises. After a time period of delay Tcs from the rise of the clock CLKT2iS, which is caused by the delay circuit 28, the clock CLKT1iS falls. Upon the fall of the clock CLKT1iS, the clock CLKG1iS rises. In this manner, in the i'th four-phase clock generation circuit 29, the four clocks CLKG1iS, CLKT1iS, CLKT2iS, and CLKG2iS, which are different in phase from each other, are generated based on the signal OSCi outputted from the oscillation circuit 10. Note that FIG. 19 shows, by way of example, how an n'th four-phase clock generation circuit 29 generates the four clocks CLKG1nS, CLKT1nS, CLKT2nS, and CLKG2nS based on a signal OSCn outputted from the oscillation circuit 10.

An i'th pump circuit 69 performs voltage boosting based on the four clocks CLKG1iS, CLKT1iS, CLKT2iS, and CLKG2iS outputted from the i'th four-phase clock generation circuit 29, and outputs a voltage Pout1 higher than a power supply voltage. The pump circuit 69 transfers electric charge for performing the voltage boosting during a period in which the level of the clock CLKG1iS or CLKG2iS is "H". Accordingly, the efficiency of the voltage boosting increases as the period becomes longer (i.e., as the time period of charge transfer Ttr becomes longer).

The detection circuit 70 has a target voltage higher than a power supply voltage. The detection circuit 70 sets a clock enable signal CP_EN to "H" level when the voltage Pout1 outputted from the pump circuits 69 is lower than the target voltage, and sets the signal CP_EN to "L" level when the voltage Pout1 is higher than the target voltage. While the signal CP_EN is at "H" level, the oscillation circuit 10 is active, and accordingly the pump circuits 69 perform voltage boosting, so that the voltage Pout1 rises. On the other hand, while the signal CP_EN is at "L" level, the oscillation circuit 10 is inactive, and accordingly the pump circuits 69 cease the voltage boosting, so that the voltage Pout1 does not rise. Thus, the voltage Pout1 outputted from the pump circuits 69 are controlled so as to coincide with the target voltage.

As described above, in a conventional booster circuit, each pump circuit 69 operates based on one oscillation clock 100 outputted from the oscillation circuit 10 (see, for example, Japanese Laid-Open Patent Publication No. 2000-331489).

Next, the pump circuits 69 included in a conventional booster circuit (FIGS. 18A and 18B) are described in detail. When the booster circuit is activated, the voltage resetting signal ACTR is held at "L" level, so that the NMOS transistor M3 included in the voltage reset circuit 67 becomes nonconductive. The pump circuit 69 outputs four clocks CLKG1iS, CLKT1iS, CLKT2iS, and CLKG2iS, each being a square wave which periodically alternates between "H" and "L" levels (see FIG. 19). Note that periods for "H" and "L" levels each have a predetermined length. As shown in FIG. 18A, the four clocks are inputted to the booster cells 68 and 62-64.

When the four-phase clock is supplied, the pump circuit 69 transfers electric charge accumulated in a booster capacitor C1 included in the booster cell 68 in the first stage to a booster capacitor C1 included in the booster cell 62 in the second stage. Then, the electric charge is transferred to a booster capacitor C1 included in the booster cell 63 in the third stage, and further to a booster capacitor C1 included in the booster cell 64 in the fourth stage. When the electric charge is sequentially transferred from one booster capacitor C1 to another, the clocks CLKT1iS and CLKT2iS are changed from a ground voltage level to a power supply voltage level at a predetermined time, whereby it is possible to suppress a drop of the boosted voltage transferred from a circuit in a preceding stage. Thereafter, the boosted voltage is transferred to a booster capacitor C1 in a next stage, where the clocks CLKG1iS and CLKG2iS are changed from a ground voltage level to a power supply voltage level at a predetermined time, so that the boosted voltage is further boosted. Thus, it is possible to obtain a voltage higher than the voltage outputted from the circuit in the preceding stage. By repeating this series of operations, it is possible to obtain a desired voltage higher than a power supply voltage VCC.

The voltage Pout1 to be outputted from the first booster block 48 is controlled by the detection circuit 70 so as to be kept at the target voltage level. As shown in FIG. 16, the detection circuit 70 receives a voltage setting signal ACTH for changing the level of the target voltage. When a relatively high voltage (e.g., 10V) is required, such as when a rewrite operation is performed on a flash EEPROM, the voltage setting signal ACTH is set at "H" level, for example. In such a case, the target voltage of the detection circuit 70 is 10V, and the voltage Pout1 to be outputted from the first booster block 48 is controlled so as to be 10V. On the other hand, when a relatively low voltage (e.g., 5V) is required, such as when a read operation is performed on a flash EEPROM, the voltage setting signal ACTH is set at "L" level, for example. In such a case, the target voltage of the detection circuit 70 is 5V, and the voltage Pout1 to be outputted from the first booster block 48 is controlled so as to be 5V. In this manner, by changing the level of the voltage setting signal ACTH, it is possible to switch the voltage Pout1 to be outputted from the booster circuit between a plurality of levels depending on modes of operation.

However, in the case where the mode suddenly transits from rewrite to read, for example, the pump circuit 69 might encounter a problem as described below when the level of the target voltage is changed. If the target voltage is changed from high level to low level, a source voltage Vs and a drain voltage Vd are suddenly decreased in a charge transfer transistor M1 included in the fourth-stage booster cell 64, so that the voltages become substantially equal to each other. Accordingly, regardless of the states of the clocks CLKG1iS and CLKT1iS, the switch transistor M2 is brought into a constant cut-off state, so that a gate voltage Vg is kept high level in the charge transfer transistor M1. As a result, regardless of the states of the clocks CLKG1iS and CLKT1iS, a gate-source voltage Vgs in the charge transfer transistor M1 becomes higher than a threshold voltage Vt (e.g., about 0.5V) of the charge transfer transistor M1, so that the charge transfer transistor M1 is brought into a constant conductive state. Accordingly, as in the fourth-stage booster cell 64, a source voltage Vs and a drain voltage Vd are suddenly decreased in a charge transfer transistor M1 included in the third-stage booster cell 63, so that each node included in the third-stage booster cell 63 is brought into the same state as each node included in the booster cell 64. As a result, the charge transfer transistor M included in the third-stage booster cell 63 is also brought into a constant conductive state. The same occurs to the second-stage booster cell 62 and the first-stage booster cell 68, so that each node included in the second-stage booster cell 62 and each node included in the first-stage booster cell 68 are brought into a state as described above. The above problem is also encountered when the power supply voltage is changed to low level simultaneously as changing the target voltage from high level to low level. In this case, indeed, the above problem might be readily encountered. If the above problem is encountered, a desired voltage level cannot be obtained after the level of the target voltage is changed, so that the current supply capability of the booster circuit is deteriorated. The above-described problem is further readily encountered if the operation voltage of the booster circuit is increasingly reduced.

Therefore, in order to prevent the above problem, each of the booster cells 68 and 62-64 include the voltage reset circuit 67. The voltage reset circuit 67 is supplied with a voltage resetting signal ACTR inputted from an R terminal of a corresponding one of the booster cells. The voltage resetting signal ACTR is placed in an active state ("H") only for a predetermined period of time (e.g., about 10 nanoseconds (ns)) when the voltage setting signal ACTH varies. Consequently, only for a period in which the voltage resetting signal ACTR is placed in an active state, a gate-source voltage (the level of which is equal to the level of the power supply voltage VCC, e.g., 2.5V) in an NMOS transistor M3 included in the voltage reset circuit 67 exceeds a threshold voltage (e.g., 0.5V) of the NMOS transistor M3, so that the NMOS transistor M3 becomes conductive. Thus, the level of a gate voltage Vg in the charge transfer transistor M1 included in each of the booster cells 68 and 62-64 is reset to the level of the ground voltage VSS. Thereafter, by changing the voltage resetting signal ACTR so as to be in an inactive state ("L"), the NMOS transistor M3 is caused to become nonconductive. Accordingly, even if the gate voltage is gradually boosted in the charge transfer transistor M1, boost charge is not lost, and therefore the pump circuit 69 is able to normally perform voltage boosting. In this manner, by providing the voltage reset circuit 67, it becomes possible to prevent the problem where the charge transfer transistor M1 is brought into a constant conductive state.

The above-described conventional booster circuit has problems as described below. In the conventional booster circuit, four-phase clocks 209 to be supplied to pump circuits 69 are separately generated by their corresponding four-phase clock generation circuits 29 based on one oscillation clock 100 outputted from the oscillation circuit 10. Also, the cycle Tosc of the oscillation clock 100 is determined by the configuration of the oscillation circuit 10 (specifically, a time period of delay caused by inverters and capacitors which are included in a ring oscillator), whereas a time period of delay Tcs between the clocks CLKT1iS and CLKT2iS is determined by the configuration of a corresponding one of the four-phase clock generation circuits 29 (specifically, a time period of delay caused by the delay circuit 28). There are two reasons that the cycle Tosc and the time period of delay Tcs are determined by different circuits. First, it is necessary to separately cancel power supply voltage characteristics, etc., of the cycle Tosc of the oscillation clock 100. Second, a time period of delay caused by each of the four-phase clock generation circuit 29 is several nanoseconds, and the number of required four-phase clock generation circuits 29 is the same as the number of pump circuits 69, so that the four-phase clock generation circuits 29 are each required to be small in size. However, in the booster circuit where the cycle Tosc and the time period of delay Tcs are separately determined by different circuits, the cycle Tosc and the time period of delay Tcs may or may not become proportional to each other depending on operating conditions, such as the power supply voltage, variations in process, temperature fluctuations, etc. Accordingly, under given operating conditions, the time period of charge transfer Ttr becomes shorter, resulting in a reduction of voltage boost efficiency. For the above reasons, it is also difficult to increase the frequency of the oscillation clock 100.

Also, in the conventional booster circuit, both the first booster block 48 and the second booster block 49 include the oscillation circuit 10 and the four-phase clock generation circuits 29, and therefore the circuit size is large. Also, if the first booster block 48 and the second booster block 49 are operated with the same four-phase clock 209, current flows to the booster blocks at the same time, resulting in an increase of peak current.

Also, in the conventional booster circuit, when the level of the clock enable signal CP_EN is changed to "L", four-phase clocks 209 to be supplied to all pump circuits 69 are simultaneously held at the same level. In such a case, regardless of the states of the pump circuits 69, all the four-phase clocks 209 are held at the same level, so that the peak current is increased compared to the normal state. Moreover, if the voltage Pout2 is higher than the voltage Pout1, the rise time of the voltage Pout2 becomes longer because the current supply capability of the second booster block 49 is lower than that of the first booster block 48.

Also, as described above, the booster cells 68 and 62-64 each include the voltage reset circuit 67 in order to prevent the problem where the charge transfer transistor M1 is brought into a constant conductive state. However, in the first-stage booster cell 68, the drain terminal and substrate node of the switch transistor M2 are held at the power supply voltage VCC, and therefore, while the voltage resetting signal ACTR is in an active state, if the level of the gate voltage in the charge transfer transistor M1 is controlled so as to become close to the level of the ground voltage, current flows from the power supply VCC to the gate terminal of the charge transfer transistor M1 via a forward-biased PN junction between the substrate and a source node in the switch transistor M2. Accordingly, in addition to the voltage reset circuit 67, the conventional booster circuit requires a time control circuit for controlling a period of time for which the voltage resetting signal ACTR is activated. As a result, the circuit size of the booster circuit is increased by the size of the time control circuit.

SUMMARY OF THE INVENTION

Therefore, an object of the present invention is to provide a booster circuit capable of solving problems as described above.

The present invention has the following features to attain the object mentioned above.

A first booster circuit of the present invention is a booster circuit operating based on a multiphase clock, comprising: an oscillation circuit for outputting a plurality of oscillation clocks different in phase from each other; a multiphase clock generation circuit for generating the multiphase clock based on a difference in phase between the plurality of oscillation clocks; and a pump circuit for generating a boosted voltage based on the multiphase clock.

In the above booster circuit, a time period of delay between clocks included in the multiphase clock is generated based on the difference in phase between the oscillation clocks outputted from the oscillation circuit, and therefore always in a proportional relationship with a cycle of the oscillation clocks. Accordingly, even if operating conditions, such as a power supply voltage, variations in process, and temperature fluctuations, are changed, and accordingly, the cycle of the oscillation clocks is changed, the time period of delay is also changed at the same rate. Therefore, a time period of charge transfer for which voltage boosting is performed can be uniquely determined. Thus, it is possible to readily design a booster circuit which allows a desired time period for charge transfer, and also it is possible to increase the frequency of the oscillation clocks.

In this case, the booster circuit further comprises: a detection circuit for comparing the boosted voltage generated in the pump circuit with a predetermined target voltage, and outputting a control signal which takes a first value when the boosted voltage is lower than the target voltage and a second value when the boosted voltage is higher than the target voltage; and a multiphase clock transfer control circuit for controlling whether to transfer the multiphase clock from the multiphase clock generation circuit to the pump circuit in accordance with the control signal. In this case, when the multiphase clock transfer control circuit ceases to transfer the multiphase clock, the multiphase clock may be held at a value taken at a time of ceasing transfer of the multiphase clock, and the multiphase clock transfer control circuit may restart transferring the multiphase clock when the multiphase clock generated by the multiphase clock generation circuit takes the value taken at a time of ceasing to be transferred.

In the above booster circuit, pump circuits sequentially cease their operation while keeping the difference in phase at the same level as that during operation. Accordingly, it is possible to prevent the flow of current becoming larger than the flow of a peak current during operation when the voltage boosting is ceased or restarted.

More preferably, the multiphase clock transfer control circuit may include: a control signal storage circuit for storing a value of the control signal for each cycle of the multiphase clock; and a clock mask circuit for passing the multiphase clock therethrough when the stored value is equal to the first value and holding the multiphase clock at a predetermined value when otherwise.

Thus, it is possible to cease the transfer of the multiphase clock at a predetermined time point within a cycle of the multiphase clock, and it is also possible to restart the transfer of the multiphase clock at the same point in time as in a cycle in which to cease the transfer.

Alternatively, the multiphase clock transfer control circuit may include: a plurality of control signal storage circuits for storing, for each cycle of the multiphase clock, values of the control signal at different times; a timing storage circuit for storing a time at which any value stored in the control signal storage circuit has been changed from the first value to the second value; and a clock mask circuit for passing the multiphase clock when the values stored in the control signal storage circuit are all equal to the first value, and holding the multiphase clock at a predetermined value in accordance with the time stored in the timing storage circuit when otherwise.

Accordingly, it is possible to cease the transfer of the multiphase clock at a plurality of times within one cycle, and therefore the voltage boosting can be immediately ceased when the value of the control signal is changed from the first value to the second value. Thus, it is possible to suppress the amount of boosted voltage which overshoots the level of a target voltage, thereby reducing the range of ripple in the boosted voltage.

A second booster circuit of the present invention is a booster circuit operating based on a multiphase clock, comprising: an oscillation circuit for outputting a plurality of oscillation clocks different in phase from each other; a multiphase clock generation circuit for generating the multiphase clock based on a difference in phase between the plurality of oscillation clocks; and a plurality of pump circuits for generating a plurality of boosted voltages different in level from each other based on the multiphase clock.

In the above booster circuit, a time period of delay between clocks included in the multiphase clock is generated based on the difference in phase between the oscillation clocks outputted from the oscillation circuit, and therefore always in a proportional relationship with a cycle of the oscillation clocks. Accordingly, even if operating conditions, such as a power supply voltage, variations in process, and temperature fluctuations, are changed, and accordingly, the cycle of the oscillation clocks is changed, the time period of delay is also changed at the same rate. Therefore, a time period of charge transfer for which voltage boosting is performed can be uniquely determined. Thus, it is possible to readily design a booster circuit which allows a desired time period for charge transfer, and also it is possible to increase the frequency of the oscillation clocks.

Further, in the above booster circuit, even in the case of generating a plurality of boost voltage, it is possible to share the oscillation circuit and the multiphase clock generation circuit between booster blocks for generating boosted voltages, and therefore it is possible to reduce the circuit size of the booster circuit.

In this case, the booster circuit may further comprise a multiphase clock delay circuit for delaying the multiphase clock, and the plurality of pump circuits may be supplied with multiphase clocks which are caused to be delayed by different time periods by the multiphase clock delay circuit.

In the above booster circuit, the plurality of pump circuits perform voltage boosting at different times from each other. Accordingly, it is possible to cause a peak current to flow to the pump circuits at different times. Thus, it is possible to suppress a peak current in the entire booster circuit to the same level as in a booster circuit including only one pump circuit.

Alternatively, the booster circuit may further comprise a boost-assist circuit for causing a current to flow between output terminals of the plurality of pump circuits only in a direction from a low voltage output terminal to a high voltage output terminal, the low voltage output terminal outputting a relatively low boosted voltage, the high voltage output terminal outputting a relatively high boosted voltage.

In the above booster circuit, when a boosted voltage outputted from the high voltage output terminal is lower than a boosted voltage outputted from the low voltage output terminal, current flows to the boost-assist circuit, and when otherwise, no current flows to the boost-assist circuit. Thus, it is possible to reduce the rise time of a relatively high boosted voltage.

More preferably, the boost-assist circuit may include an N-channel transistor in which a drain terminal and a gate terminal are connected to the low voltage output terminal, a source terminal is connected to the high voltage output terminal, and a bulk is grounded.

In the above booster circuit, the N-channel transistor acts as a diode, and therefore it is possible to readily configure a boost-assist circuit which allows current to flow only in a direction from the low voltage output terminal to the high voltage output terminal.

Alternatively, the boost-assist circuit may include: a first N-channel transistor in which a drain terminal and a gate terminal are connected to the low voltage output terminal, and a source terminal is connected to the high voltage output terminal; a second N-channel transistor in which a drain terminal is connected to the low voltage output terminal, and a gate terminal is connected to the high voltage output terminal; and a third N-channel transistor in which a drain terminal is connected to the high voltage output terminal, and a gate terminal is connected to the low voltage output terminal. In this case, the source terminal of the second N-channel transistor and the source terminal of the third N-channel transistor may be both connected to a bulk of each of the first N-channel transistor, the second N-channel transistor, and the third N-channel transistor.

In the above booster circuit, the N-channel transistor acts as a diode, and therefore it is possible to configure a boost-assist circuit which allows current to flow only in a direction from the low voltage output terminal to the high voltage output terminal. Further, the second and third N-channel transistors can be used for controlling a substrate voltage of the first N-channel transistor, thereby suppressing the generation of the substrate bias effect. Thus, it is possible to cause a larger current to flow to the boost-assist circuit, thereby further reducing the rise time of the relatively high boosted voltage.

A third booster circuit of the present invention is a booster circuit operating based on a multiphase clock, comprising an oscillation circuit for outputting a plurality of oscillation clocks different in phase from each other; a multiphase clock generation circuit for generating the multiphase clock based on the plurality of oscillation clocks; and a pump circuit for generating a boosted voltage based on the multiphase clock. In this case, the pump circuit includes a plurality of booster cells connected in series with each other, the plurality of booster cells each include: a charge transfer transistor for transferring an output voltage from a circuit in a previous stage to a circuit in a next stage; an output voltage boosting capacitor having a first electrode connected to an output terminal of the charge transfer transistor and a second electrode to which a first clock contained in the multiphase clock is applied; a gate voltage boosting capacitor having a first electrode connected to a gate terminal of the charge transfer transistor and a second electrode to which a second clock contained in the multiphase clock; a switch transistor for performing switching to couple an input terminal of the charge transfer transistor to a gate terminal thereof; and a voltage reset circuit for resetting a gate voltage of the charge transfer transistor to a predetermined voltage level in accordance with a given reset control signal, and in a booster cell in a first stage, an inverted signal of the reset control signal is applied to a well of the charge transfer transistor and a well of the switch transistor, and in a booster cell in any stage other than the first stage, the output voltage of the circuit in the previous stage is applied to a well of the charge transfer transistor and a well of the switch transistor.

In the above booster circuit, when the voltage reset circuit is used to reset the gate voltage of the charge transfer transistor, no stationary current flows to the pump circuit. Accordingly, it is unnecessary to control a time period for which the voltage reset circuit is activated, and it is also unnecessary to provide a time control circuit for controlling the time period for which the voltage reset circuit is activated. Thus, it is possible to reduce the circuit size of the booster circuit.

As described above, in the booster circuit of the present invention, the time period of delay between clocks and the cycle of the oscillation clocks are always in a proportional relationship with each other, and therefore it is possible to obtain a desired charge transfer time, and increase the frequency of the oscillation clocks. Also, the multiphase clock transfer control circuit can be used to suppress the amount of peak current and thereby to suppress the amount of boosted voltage which overshoots the level of a target voltage. Also, in the case of generating a plurality of boosted voltages, the oscillation circuit and the multiphase clock generation circuit can be shared between the booster blocks, whereby it is possible to reduce the circuit size. Also, the above multiphase clock delay circuit can be used for suppressing the amount of peak current. Also, the boost-assist circuit can be used for reducing the rise time of the boosted voltages. Also, by configuring a first-stage booster cell in a manner as described above, it becomes possible to reduce the circuit size.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram illustrating a second exemplary configuration of the four-phase clock transfer control circuit included in the booster circuit shown in FIG. 1;

FIGS. 8A, 8B, and 8C are each a diagram illustrating an exemplary configuration of a pump circuit included in the booster circuit shown in FIG. 1;

DESCRIPTION OF THE PREFERRED EMBODIMENTS

Figure 1:
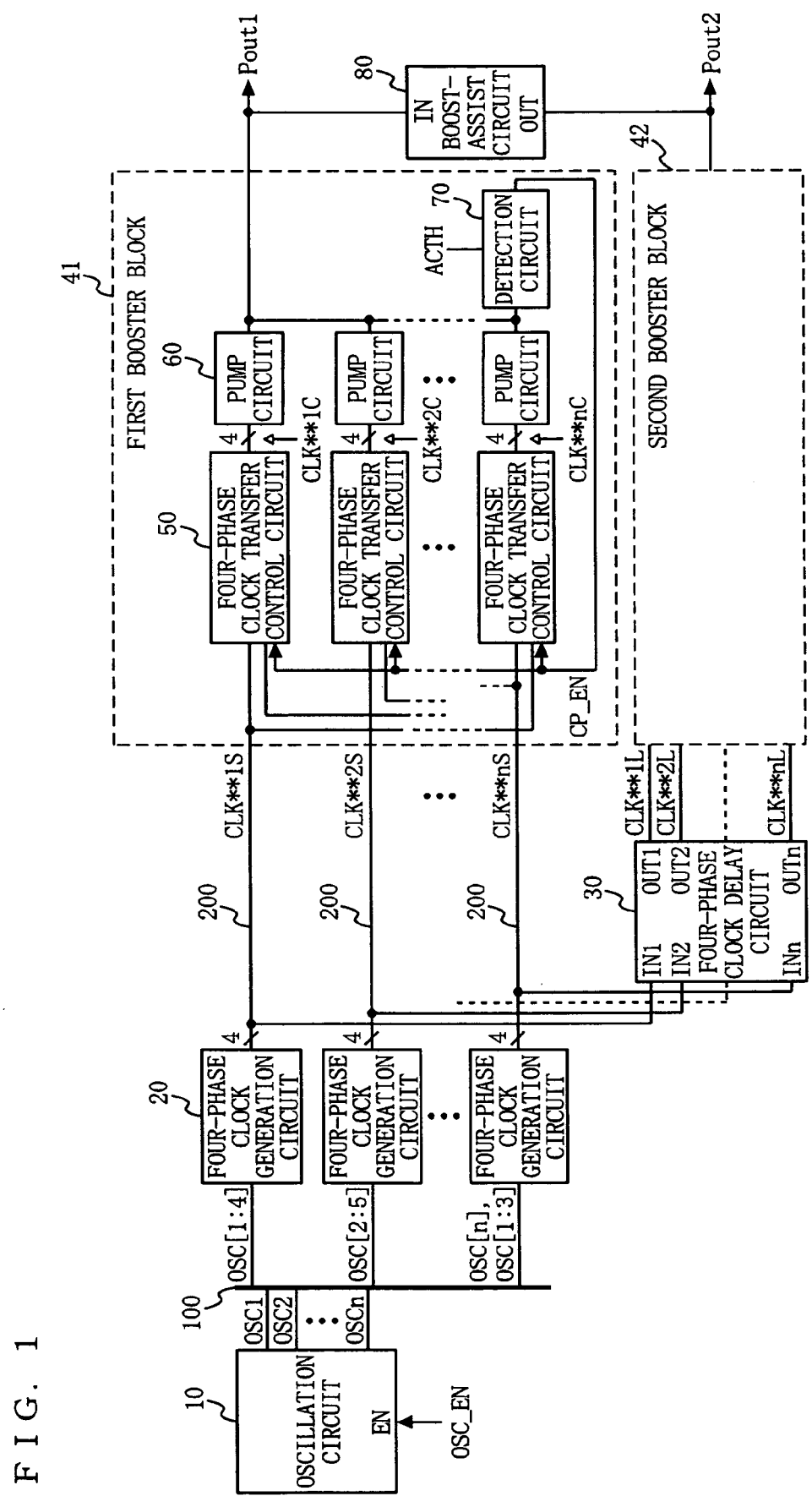
FIG. 1 is a block diagram illustrating a configuration of a booster circuit according to an embodiment of the present invention.

FIG. 1 is a block diagram illustrating a configuration of a booster circuit according to an embodiment of the present invention. The booster circuit includes an oscillation circuit 10; a plurality of four-phase clock generation circuit 20; a four-phase clock delay circuit 30; a first booster block 41; a second booster block 42; and a boost-assist circuit 80. The first booster block 41 includes four-phase clock transfer control circuits 50 equal in number to the four-phase clock generation circuits 20, pump circuits 60 equal in number to the four-phase clock transfer control circuits 50, and a detection circuit 70. The second booster block 42 is configured in a manner similar to the first booster block 41. The first booster block 41 generates a voltage Pout1 higher than a power supply voltage, and the second booster block 42 generates a voltage Pout2 higher than the voltage Pout1.

The booster circuit shown in FIG. 1 has the following major features. Specifically, the four-phase clock generation circuits 20 generate four-phase clocks 200 based on a plurality of oscillation clocks 100 outputted from the oscillation circuit 10. The four-phase clocks 200 generated by the four-phase clock generation circuits 20 are delayed in increments of time due to the action of the four-phase clock delay circuit 30, and supplied to the first booster block 41 and the second booster block 42. The four-phase clock transfer control circuits 50 are characteristically configured to cause the transfer of the four-phase clocks 200 to cease in a predetermined state. Also, booster cells included in the pump circuits 60 are characteristically configured so as to reduce the circuit size of the booster circuit. Also, the booster circuit shown in FIG. 1 is characterized by including the boost-assist circuit 80 for reducing the rise time of the voltage Pout2.

The following descriptions are based on the assumption that the booster circuit shown in FIG. 1 includes n four-phase clock generation circuits 20 (where n is an integer equal to or more than 2), and each of the first booster block 41 and the second booster block 42 includes n four-phase clock transfer control circuits 50 and n pump circuits 60. Also, in the following descriptions, i denotes an integer within the range of 1 to n.

The booster circuit shown in FIG. 1 generally operates in a manner as described below. The oscillation circuit 10 has an EN terminal to which an oscillation enable signal OSC_EN for controlling whether to perform oscillation is supplied. While the level of the oscillation enable signal OSC_EN is "H", the oscillation circuit 10 outputs n oscillation clocks 100 (OSC1 to OSCn) different in phase from each other. The four-phase clock generation circuits 20 generate four-phase clocks 200, each being composed of four clocks different in phase (e.g., CLKG11S, CLKT11S, CLKT12S, and CLKG12S; in FIG. 1, CLK**1S is shown), based on four oscillation clocks 100 (e.g., OSC1 to OSC4) outputted from the oscillation circuit 10. The four-phase clock transfer control circuits 50 control whether to transfer the four-phase clocks 200 from the four-phase clock generation circuits 20 to the pump circuits 60 in accordance with a clock enable signal CP_EN outputted from the detection circuit 70. In the case of not transferring the four-phase clocks 200, outputs from the four-phase clock transfer control circuits 50 are fixed at high (H) or low (L) level. The pump circuits 60 each operate in accordance with a four-phase clock outputted from a corresponding one of the four-phase clock transfer control circuits 50, and generate a voltage Pout1 (or voltage Pout2) higher than a power supply voltage. In order to control the voltage Pout1 (or voltage Pout2) outputted from each of the pump circuits 60 so as to be at the level of a target voltage, the detection circuit 70 outputs a clock enable signal CP_EN to the four-phase clock transfer control circuits 50 based on the level of the voltage Pout1 (or voltage Pout2).

The four-phase clock delay circuit 30 causes the four-phase clocks 200 generated by the four-phase clock generation circuits 20 to be delayed by a predetermined period of time Td. The first booster block 41 receives the four-phase clocks 200 directly from the four-phase clock generation circuits 20, while the second booster block 42 receives the four-phase clocks 200 via the four-phase clock delay circuit 30. The boost-assist circuit 80 is provided between an output terminal of the first booster block 41 and an output terminal of the second booster block 42. The boost-assist circuit 80 causes current to flow only in a direction from the output terminal of the first booster block 41 to the output terminal of the second booster block 42.

Figure 2:
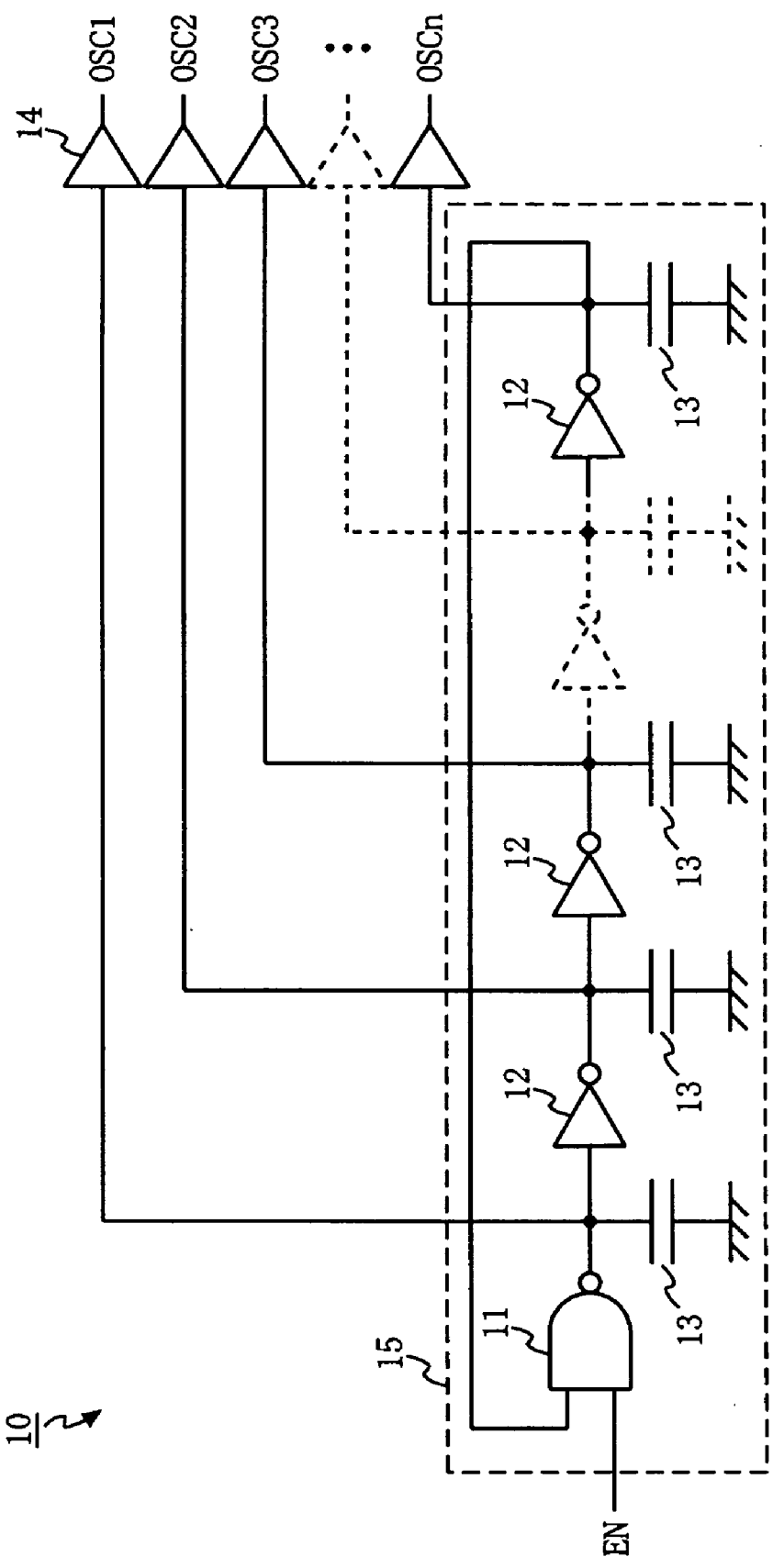
FIG. 2 is a diagram illustrating an exemplary configuration of an oscillation circuit included in the booster circuit shown in FIG. 1.

Hereinbelow, exemplary configurations of circuits shown in FIG. 1 will be described with reference to FIGS. 2-10. FIG. 2 is a diagram illustrating an exemplary configuration of the oscillation circuit 10. The oscillation circuit 10 shown in FIG. 2 includes a NAND gate 11, (n−1) inverters 12, n capacitors 13, and n buffers 14. The elements other than the buffers 14 constitute a ring oscillator 15.

Figure 3:
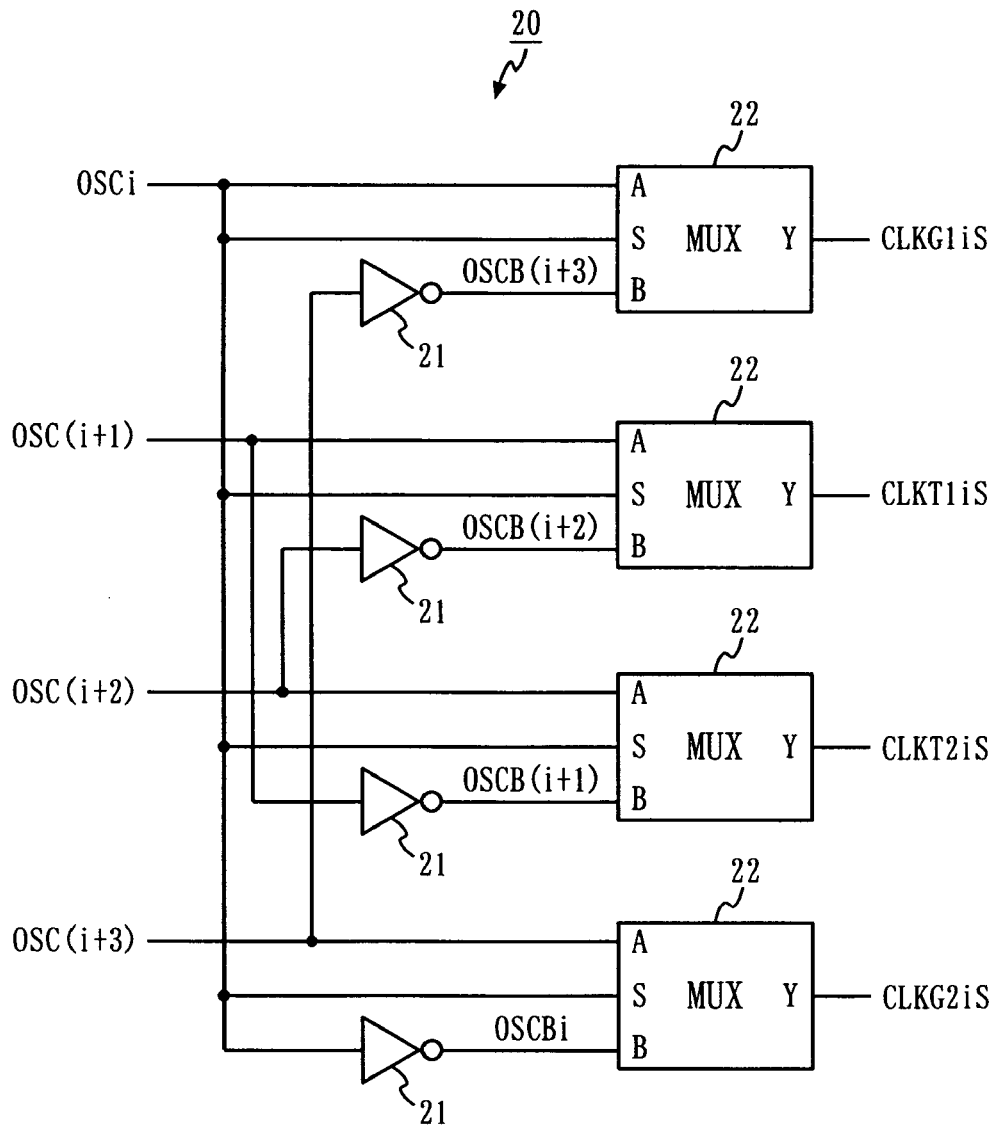
FIG. 3 is a diagram illustrating an exemplary configuration of a four-phase clock generation circuit included in the booster circuit shown in FIG. 1.
Figure 4:
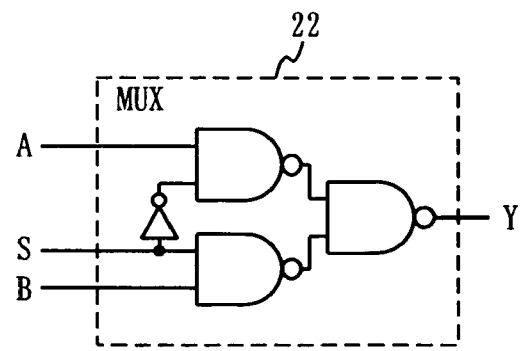
FIG. 4 is a diagram illustrating an exemplary configuration of a selector included in the four-phase clock generation circuit shown in FIG. 3.

FIG. 3 is a diagram illustrating an exemplary configuration of an i'th four-phase clock generation circuit 20. In FIG. 3, inverters 21 output inverse clocks OSCBi to OSCB (i+3), which are obtained by inverting signals OSCi to OSC (i+3) outputted from the oscillation circuit 10. Selection circuits 22 shown in FIG. 3 are each configured as shown in FIG. 4, for example. The circuit shown in FIG. 4 outputs input A when input S is at "L" level, and outputs input B when the input S is at "H" level. Note that the selection circuit 22 as shown in FIG. 4 is also used in circuits other than the four-phase clock generation circuits 20.

Figure 5:
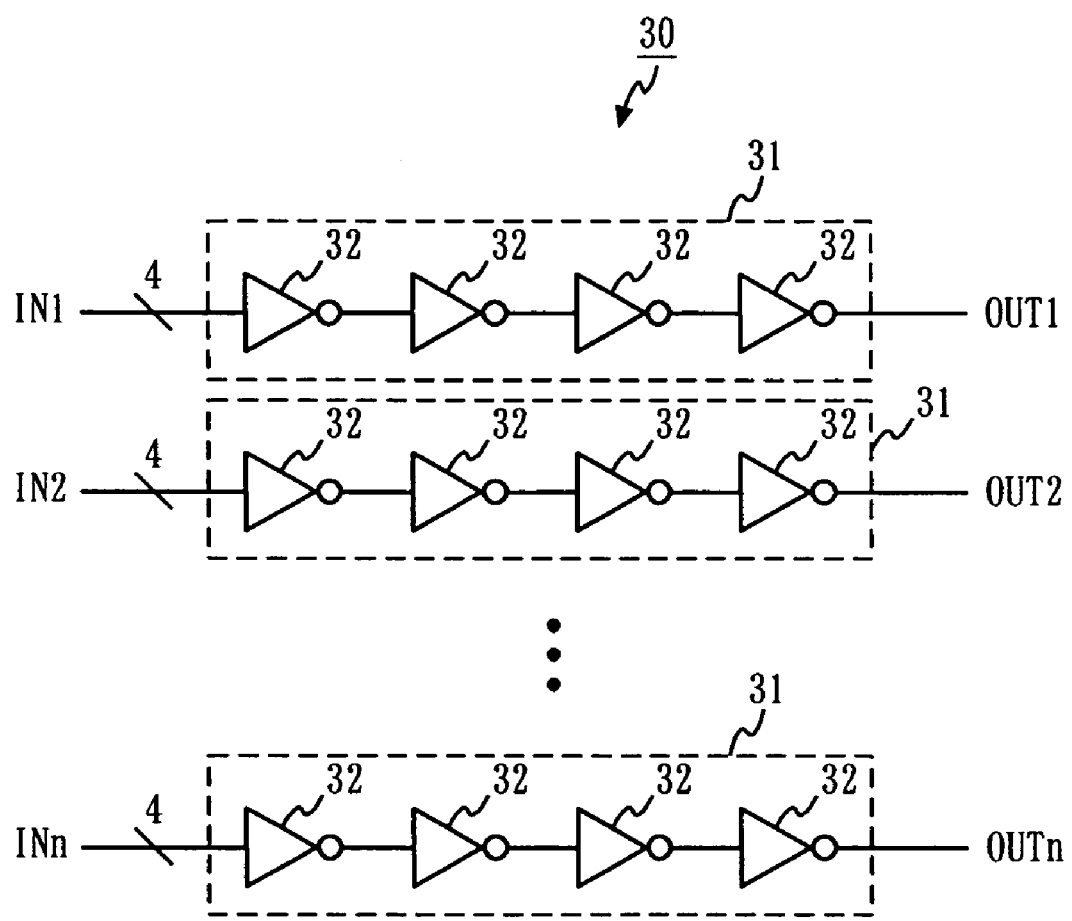
FIG. 5 is a diagram illustrating an exemplary configuration of a four-phase clock delay circuit included in the booster circuit shown in FIG. 1.

FIG. 5 is a diagram illustrating an exemplary configuration of the four-phase clock delay circuit 30. The four-phase clock delay circuit 30 shown in FIG. 5 includes n delay sections 31. The delay sections 31 are each a circuit in which a plurality of inverters 32 are connected in series with each other, and cause the four-phase clocks 200 generated by the four-phase clock generation circuits 20 to be delayed by a time period of delay Td. Note that the inverters 32 shown in FIG. 5 are each schematically represented by a mark which is meant to indicate four one-input, one-output inverters.

Figure 6:
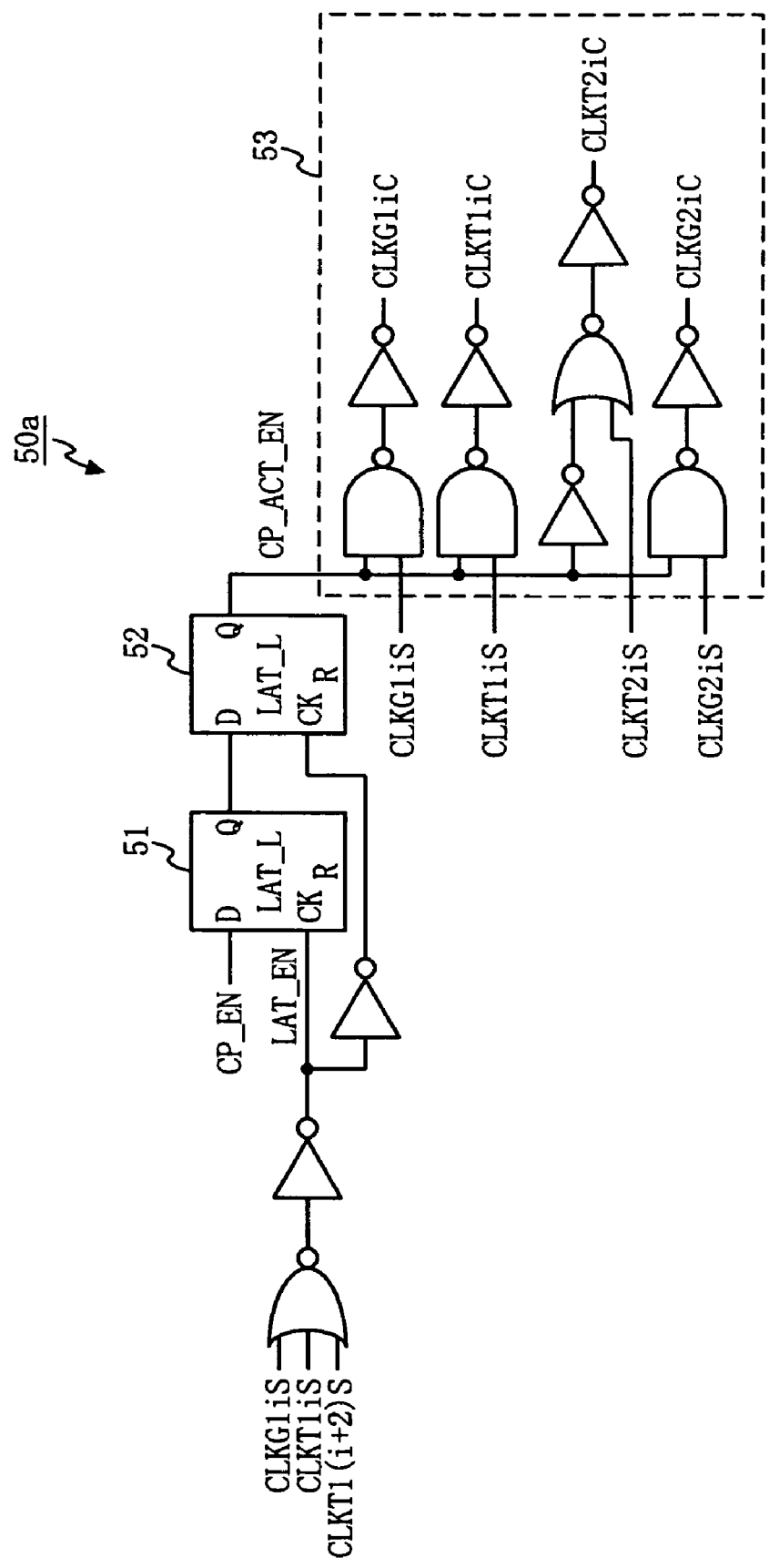
FIG. 6 is a diagram illustrating a first exemplary configuration of a four-phase clock transfer control circuit included in the booster circuit shown in FIG. 1.

FIG. 6 is a diagram illustrating a first exemplary configuration of the four-phase clock transfer control circuits 50, and FIG. 7 is a diagram illustrating a second exemplary configuration of the four-phase clock transfer control circuits 50. In FIGS. 6 and 7, latch circuits 51, 52, and 56-58 provide an output at a fixed level (the latch circuits 51, 52, and 58 provide "H"-level outputs, and the latch circuits 56 and 57 provide "L"-level output) when input R is at "H" level (reset operation). Alternatively, input D is outputted without being processed when input R is at "L" level and input CK is at "H" level (through-output operation) Alternatively still, when the level of input CK is changed from "H" to "L", input D is stored and outputted (latch operation). The latch circuits 52 and 57 each act as a control signal storage circuit for storing a clock enable signal CP_EN. The latch circuit 58 acts as a timing storage circuit for storing a time at which any value stored in the latch circuits 52 and 57 has been changed from "H" to "L". Also, clockmask circuits 53 and 59 shown in FIGS. 6 and 7 mask the four-phase clocks 200 in accordance with a value stored in the latch circuit 52, for example.

FIGS. 8A, 8B, and 8C are each a diagram illustrating an exemplary configuration of the pump circuits 60. As shown in FIG. 8A, each pump circuit 60 includes four booster cells 61-64. The booster cell 61 in the first stage is of a type as shown in FIG. 8B, and the booster cells 62-64 are of a type as shown in FIG. 8C. The first-stage booster cell 61 has a VINC terminal connected to an inverter 66, and the booster cell 64 at the last stage has an output terminal connected to a rectifier transistor 65.

Figure 9:
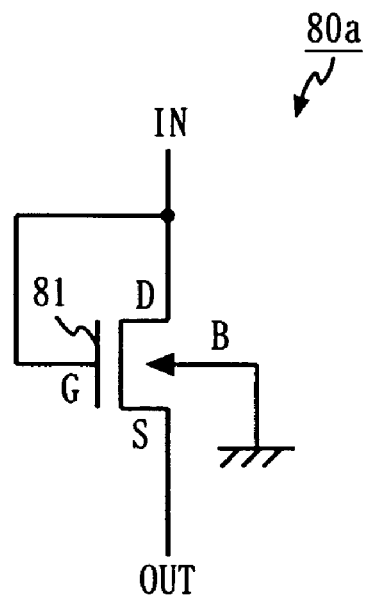
FIG. 9 is a diagram illustrating a first exemplary configuration of a boost-assist circuit included in the booster circuit shown in FIG. 1.

FIG. 9 is a diagram illustrating a first exemplary configuration of the boost-assist circuit 80. In FIG. 9, a boost-assist circuit 80a includes an N-channel transistor 81 having a triple-well structure. The N-channel transistor 81 has a P-substrate, an N-well, and a P-well, which are coupled to a ground voltage. Also, the N-channel transistor 81 has a drain terminal and a gate terminal, which are connected to an IN terminal of the boost-assist circuit 80a, and also has a source terminal connected to an OUT terminal of the boost-assist circuit 80a. Thus, the N-channel transistor 81 acts as a diode which causes current to flow only in a direction from the IN terminal to the OUT terminal.

Figure 10:
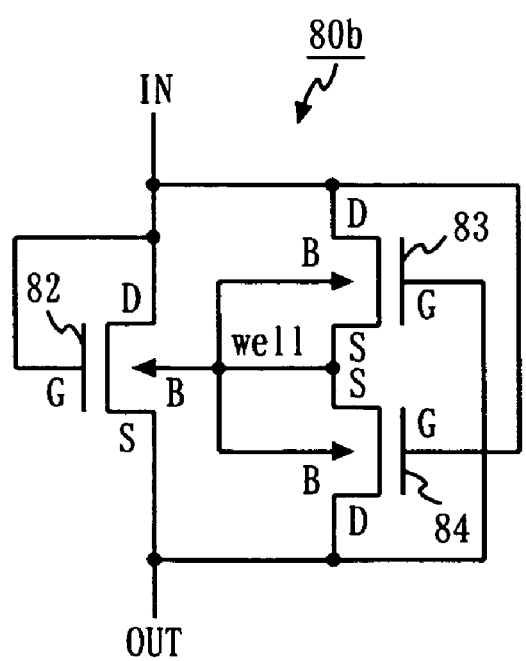
FIG. 10 is a diagram illustrating a second exemplary configuration of the boost-assist circuit included in the booster circuit shown in FIG. 1.

FIG. 10 is a diagram illustrating a second exemplary configuration of the boost-assist circuit 80. In FIG. 10, a boost-assist circuit 80b includes three N-channel transistors 82, 83, and 84 having a triple-well structure. The N-channel transistor 82 has a drain terminal, a gate terminal, and a source terminal, which are connected as in the N-channel transistor 81 shown in FIG. 9. The N-channel transistor 83 has a drain terminal connected to an IN terminal of the boost-assist circuit 80b, and a gate terminal connected to an OUT terminal of the boost-assist circuit 80b. The N-channel transistor 84 has a drain terminal connected to the OUT terminal of the boost-assist circuit 80b, and a gate terminal connected to the IN terminal of the boost-assist circuit 80b. The N-channel transistors 83 and 84 each have a source terminal connected to bulks of the N-channel transistors 82-84. Similar to the N-channel transistor 81 shown in FIG. 9, the N-channel transistor 82 acts as a diode, and the N-channel transistors 83 and 84 control P-well potential in the N-channel transistor 82.

Hereinbelow, the details of the booster circuit shown in FIG. 1 will be described in the order of a method for generating the four-phase clocks 200, the four-phase clock delay circuit 30, the four-phase clock transfer control circuits 50, the pump circuits 60, and the boost-assist circuit 80.

Figure 11:
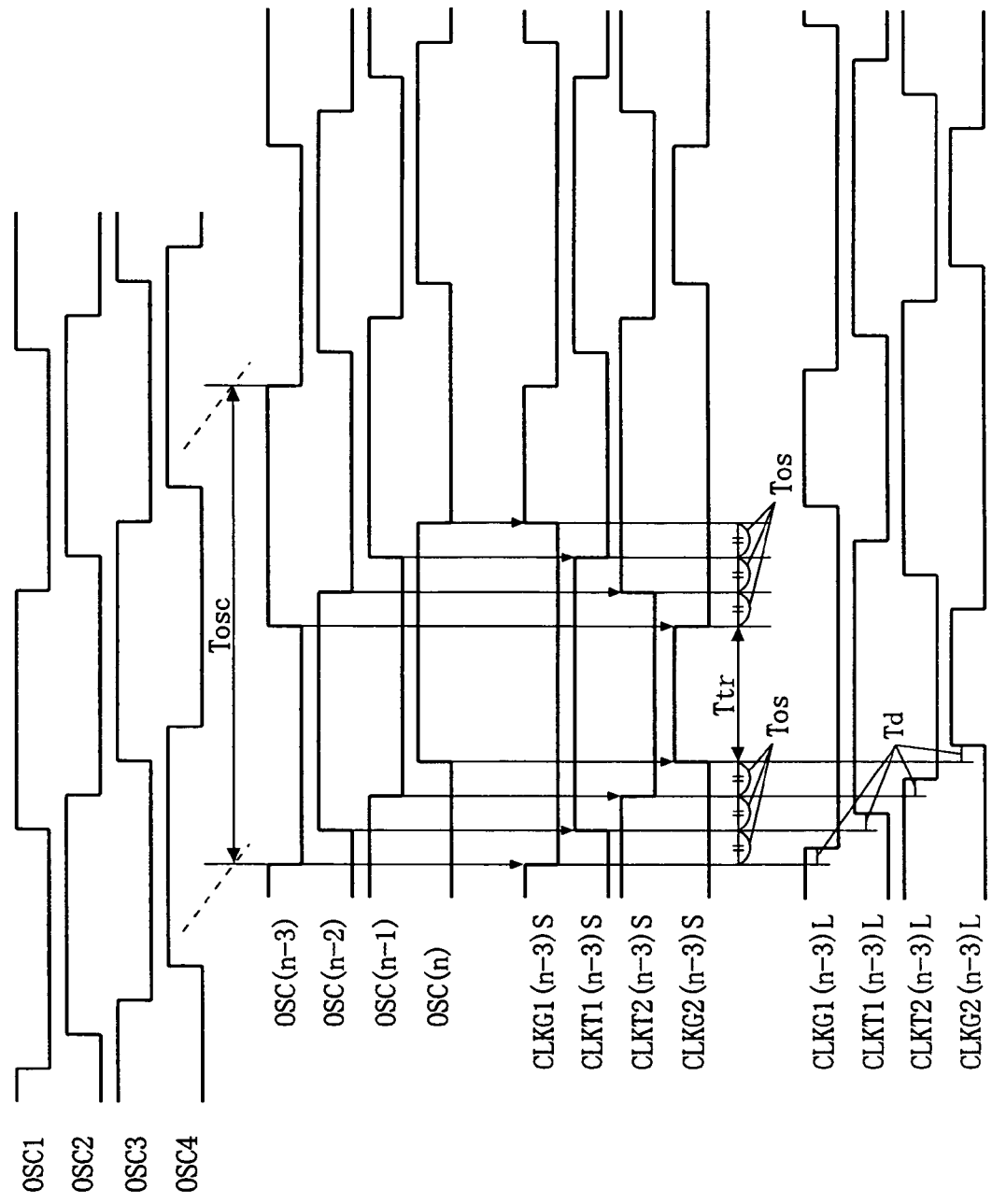
FIG. 11 is a timing chart for the four-phase clock generation circuit shown in FIG. 3.

First, the method for generating the four-phase clocks 200 is described with reference to FIG. 11. As described above, in the oscillation circuit 10 (FIG. 2), the NAND gate 11, the inverters 12, and the capacitors 13 constitute the ring oscillator 15. The ring oscillator 15 oscillates while an oscillation enable signal OSC_EN inputted from the EN terminal is at "H" level. More specifically, when a time period of delay caused by each inverter 12 is assumed to be Tos, the ring oscillator 15 outputs, as oscillation clocks 100, n signals OSCi to OSCn, which are sequentially delayed in increments of the time period of delay Tos. The oscillation clocks 100 each have a cycle of Tosc, which is represented by Tosc=Tos× (number of inverters+1)×2 based on the number of inverters 12 included in the ring oscillator 15. Accordingly, Tosc=Tos× 2n.

In an i'th four-phase clock generation circuit 20 (FIG. 3), when a signal OSCi outputted from the oscillation circuit 10 falls, a clock CLKG1iS falls. After a lapse of a time period of Tcs, when a signal OSC (i+1) rises, a clock CLKT1iS rises. After a lapse of another time period of Tos, when a clock OSC (i+2) falls, a clock CLKT2iS falls. After a lapse of still another time period of Tos, when a clock OSC (i+3) rises, a clock CLKG2iS rises. After a lapse of a time period of charge transfer Ttr, when the signal OSCi rises, the clock CLKG2iS falls. After a lapse of a time period of Tos, when the clock OSC (i+1) falls, the clock CLKT2iS rises. After a lapse of another time period of Tos, when the clock OSC (i+2) rises, the clock CLKT1iS falls. After a lapse of still another time period of Tos, when the clock OSC (i+3) falls, the clock CLKG1iS rises. FIG. 11 shows, by way of example, how an (n−3)'th four-phase clock generation circuit 20 generates, as four-phase clocks 200, four clocks CLKG1 (n−3) S, CLKT1 (n−3) S, CLKT2 (n−3) S, and CLKG2 (n−3) S, which are different in phase with each other, based on signals OSC (n−3) to OSCn outputted from the oscillation circuit 10.

Figure 16:
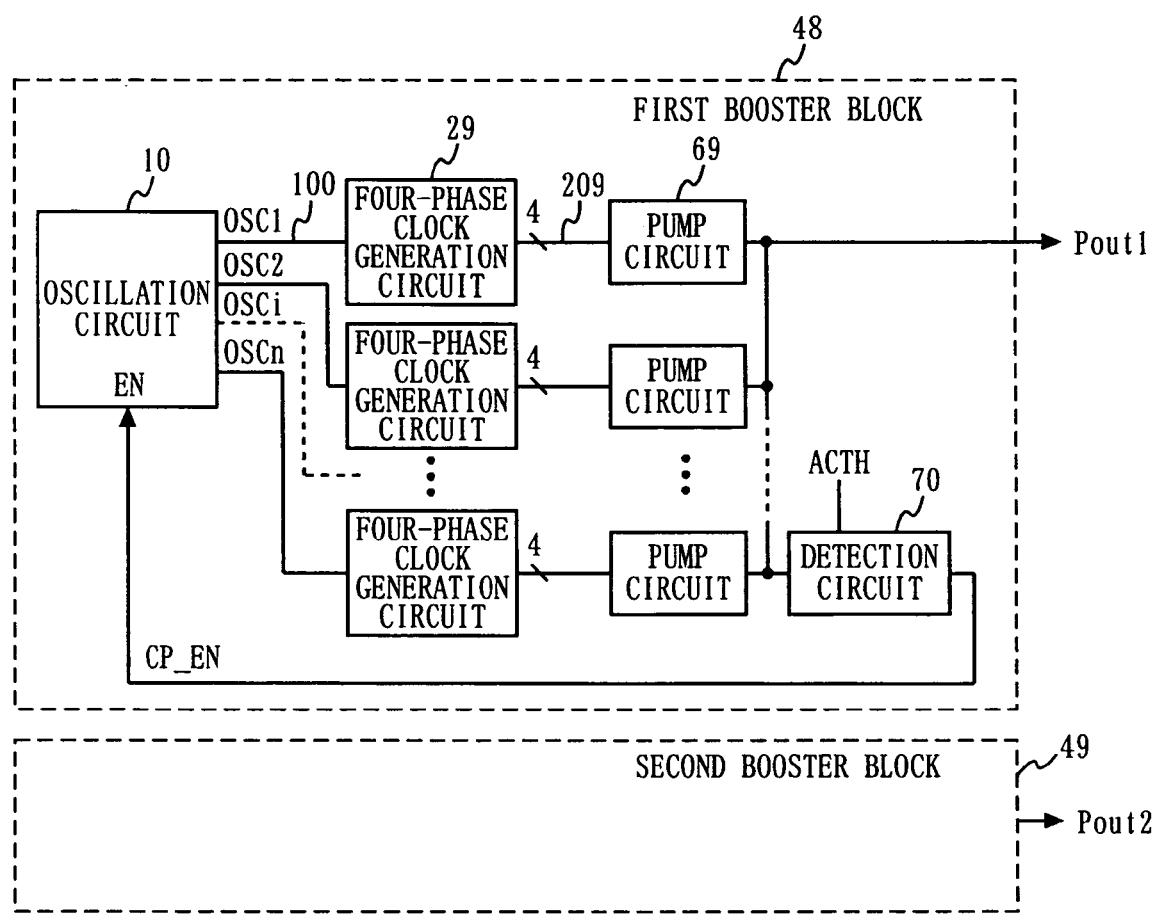
FIG. 16 is a diagram illustrating the configuration of a conventional booster circuit.
Figure 17:
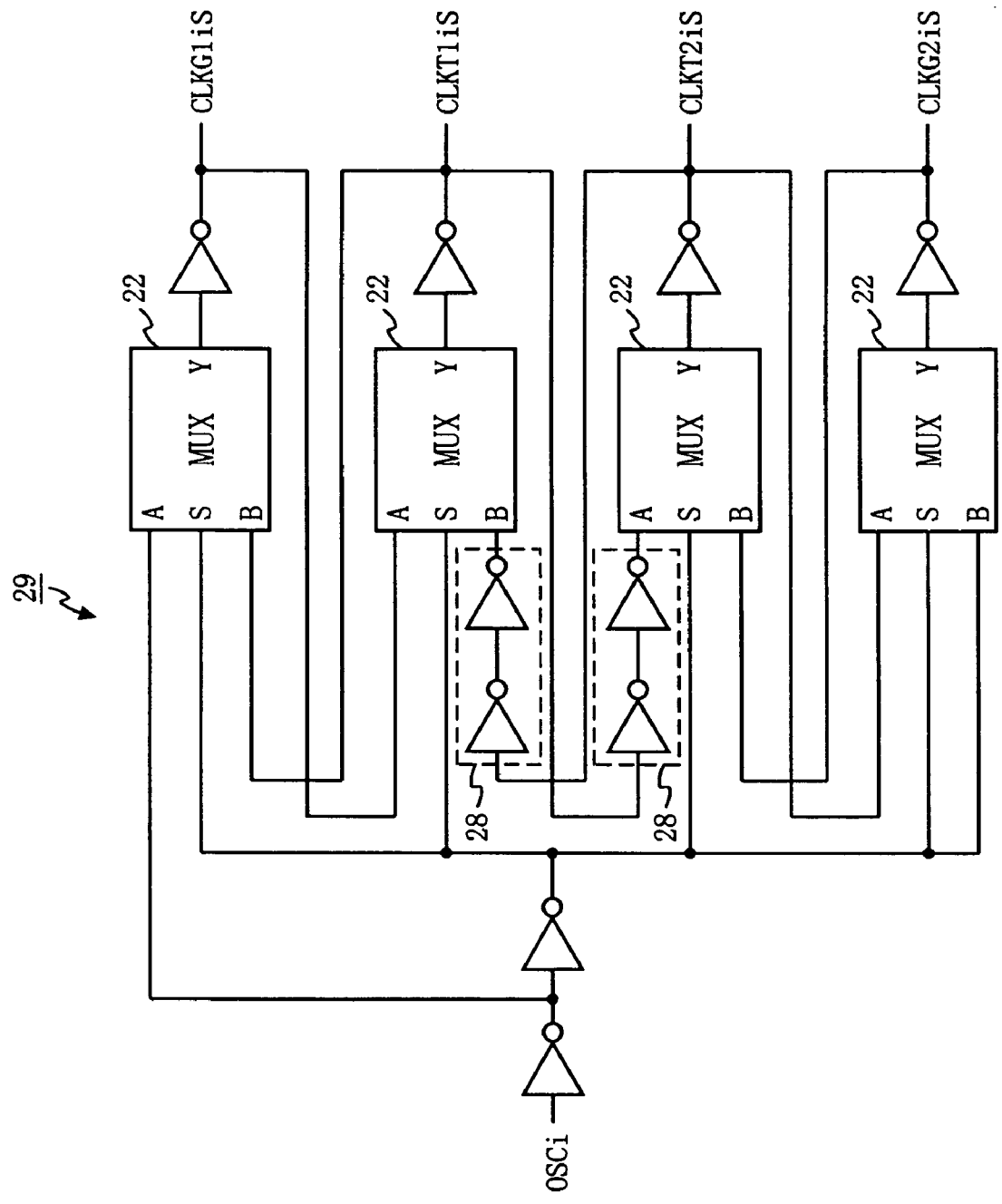
FIG. 17 is a diagram illustrating an exemplary configuration of a four-phase clock generation circuit included in a booster circuit.

In the conventional booster circuit (FIG. 16), a four-phase clock 209 generated by each four-phase clock generation circuit 29 contains clocks caused to be delayed in increments of a time period of delay Tcs by delay circuits 28 included in the four-phase clock generation circuit 29. On the other hand, in the booster circuit according to the present embodiment (FIG. 1), a four-phase clock 200 generated by each four-phase clock generation circuit 20 contains clocks caused to be delayed in increments of a time period of delay Tos based on differences in phase between oscillation clocks 100 outputted from the oscillation circuit 10. Also, in the booster circuit according to the present embodiment, the cycle Tosc and the time period of delay Tos are always in a proportional relationship, such as Tosc=Tos×2n.

Accordingly, in the booster circuit according to the present embodiment, even if operating conditions, such as a power supply voltage, variations in process, and temperature fluctuations, are changed, and accordingly, the cycle Tosc is changed, the time period of delay Tos is also changed at the same rate. Therefore, the time period of charge transfer Ttr for which voltage boosting is performed can be uniquely determined. Thus, it is possible to readily design a booster circuit which allows a desired time period for charge transfer, and also it is possible to increase the frequency of the oscillation clocks 100.

Described next is the four-phase clock delay circuit 30. The four clocks CLKG1iS, CLKT1iS, CLKT2iS, and CLKG2iS generated by the i'th four-phase clock generation circuit 20 are caused to be delayed in increments of a predetermined time period of delay Td by the four-phase clock delay circuit 30 and become four clocks CLKG1iL, CLKT1iL, CLKT2iL, and CLKG2iL, respectively. Here, the time period of delay Td is determined such that the first and second booster blocks 41 and 42 are not caused to operate at the same time, i.e., such that the levels of the clocks CLKG1iS, CLKT1iS, CLKT2iS, and CLKG2iS are not changed at the same time as those of the clocks CLKG1iL, CLKT1iL, CLKT2iL, and CLKG2iL.

Accordingly, with the booster circuit including the four-phase clock delay circuit 30, it is possible to cause a peak current to flow to the pump circuits 60 at different times. Thus, it is possible to suppress a peak current in the entire booster circuit to the same level as in a booster circuit including only one pump circuit.

Next, a four-phase clock transfer control circuit 50*a* (FIG. 6) is described with reference to FIG. 12. Assume in the example described herein that n is 5, i.e., the booster circuit includes five four-phase clock generation circuits 20, and the first booster block 41 includes five four-phase clock transfer control circuits 50*a*.

Figure 12:
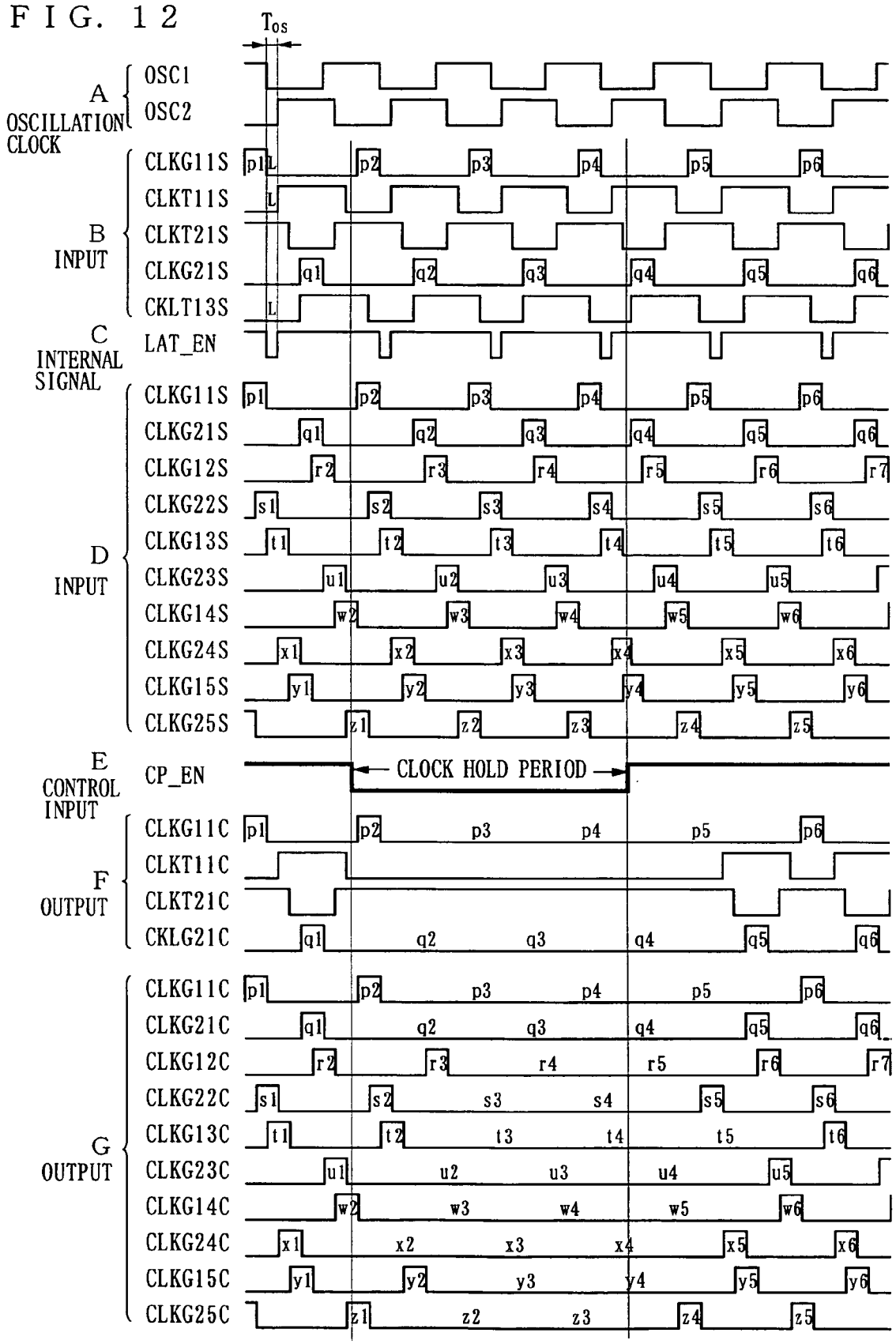
FIG. 12 is a timing chart for the four-phase clock transfer control circuit shown in FIG. 6.

FIG. 12 is a timing chart for the four-phase clock transfer control circuits 50*a*. In a manner as described above, the oscillation circuit 10 outputs five signals OSC1 to OSC5 which are caused to be sequentially delayed in increments of a time period of delay Tos (in FIG. 12, section A shows part of the five signals, i.e., OSC1 and OSC2). Referring to section B in FIG. 12, a first four-phase clock generation circuit 20 generates four clocks CLKG11S, CLKT11S, CLKT21S, and CLKG21S based on four signals OSC1 to OSC4. Referring to section D in FIG. 12, the levels of four-phase clocks 200 generated by second through fifth four-phase clock generation circuits 20 are changed at times different from the times when the levels of four-phase clocks 200 generated by the first four-phase clock generation circuit 20 are changed (for simplification of the timing chart of FIG. 12, only two of the five four-phase clocks 200, i.e., CLKG1iS and CLKG2iS, are shown insection D). An i'th four-phase clock transfer control circuit 50 receives six signals, i.e., four clocks CLKG1iS, CLKT1iS, CLKT2iS, and CLKG2iS generated by an i'th four-phase clock generation circuit 20, a clock CLKT1 (i+2) S, which is delayed from CLKT1iS by 2×Tos, and a clock enable signal CP_EN outputted from the detection circuit 70.

In the four-phase clock transfer control circuits 50*a* (FIG. 6), when all the clocks CLKG1iS, CLKT1iS, and CLKT1 (i+2) S become "L" level (on the falling edge of CLKG1iS), the level of a latch enable signal LAT_EN is changed from "H" to "L". At this time, the latch circuit 51 extracts the clock enable signal CP_EN, and the latch circuit 52 passes output Q of the latch circuit 51 therethrough.

The state where the clocks CLKG1iS, CLKT1iS, and CLKT1 (i+2) S are all at "L" level lasts for a time period of Tos. After a lapse of the time period of Tos, when the clock CLKT1iS rises, the level of LAT_EN is changed from "L" to "H", and the latch circuit 52 holds the output Q of the latch circuit 51. While the level of LAT_EN is "H", CP_EN falls, and thereafter, the level of LAT_EN is changed from "H" to "L" and further from "L" to "H". When the level of LAT_EN is changed back to "H", the level of a clock activation signal CP_ACT_EN is changed to "L". While the level of CP_ACT_EN is "L", the clockmask circuit 53 holds CLKG1iC, CLKT1iC, CLKT2iC, and CLKG2iC at "L", "L", "H", and "L", respectively. In this manner, while the level of CP_ACT_EN is "L", the four-phase clocks 200 generated by the four-phase clock generation circuits 20 are not transferred to a corresponding one of the pump circuits 60.

Thereafter, when the level of CP_EN is changed to "H", and accordingly the level of CP_ACT_EN is changed to "H", the clock mask circuit 53 outputs, as CLKG1iC, CLKT1iC, CLKT2iC, and CLKG2iC, the four input clocks CLKG1iS, CLKT1iS, CLKT2iS, and CLKG2iS without being processed. In this manner, while the level of CP_ACT_EN is at "H", the four-phase clocks 200 generated by the four-phase clock generation circuits 20 are transferred to a corresponding one of the pump circuits 60.

In the four-phase clock transfer control circuits 50a, the level of the clock activation signal CP_ACT_EN is changed only when inputted four-phase clocks 200 are in a predetermined state. Specifically, in an i'th four-phase clock transfer control circuit 50a, the level of CP_ACT_EN is changed only when CLKG1iS, CLKT1iS, and CLKT1 (i+2) S all become "L" level, i.e., when CLKG1iS falls. As such, the four-phase clock transfer control circuits 50a perform switching to transfer the four-phase clocks 200 only at a predetermined time within one cycle of the oscillation clocks 100.

For example, consider a case where, when four-phase clocks 200 are sequentially inputted to a first four-phase clock transfer control circuit 50, as shown in section B of FIG. 12, the level of CP_EN is changed as shown in section E of FIG. 12. In this case, even if the level of CP_EN is changed to "L", the level of CP_ACT_EN remains "H" until CLKG11S falls. In actuality, after the level of CLK_EN is changed to "L", the level of CP_ACT_EN is changed to "L" on the falling edge of CLKG11S at p2. After the fall of CLKG11S at p2, as shown in section F of FIG. 12, the levels of CLKG11C, CLKT11C, CLKT21C, and CLKG21C are held at the same level as when CLKG11S falls at p2 (specifically, CLKG11C, CLKT11C, CLKT21C, and CLKG21C are held at "L", "L", "H", and "L" levels, respectively). Accordingly, as shown in section F of FIG. 12, clock pulses of CLKG11C at p3, p4, and p5, and clock pulses of CLKG21C at q2, q3, and q4 are not transferred to a first pump circuit 60 corresponding to the first four-phase clock transfer control circuit 50.

Next, consider a case where, after a period in which the levels of clocks are held (hereinafter, referred to as a "clock hold period"), the level of CP_EN is changed to "H" as shown in FIG. 12. In this case, if the level of CP_EN is changed to "H", CP_ACT_EN remains at "L" level until CLKG11S falls. In actuality, after the level of CLK_EN is changed to "H", the level of CP_ACT_EN is changed to "H" on the falling edge of CLKG11S at p5. After the fall of CLKG11S at p5, as shown in section F of FIG. 12, the four input clocks CLKG11S, CLKT11S, CLKT21S, and CLKG21S are outputted as CLKG11C, CLKT11C, CLKT21C, and CLKG21C without being processed. Thus, clock pulses of CLKG21C at and after p6 and clock pulses of CLKG21C at and after q5 are transferred to the first pump circuit 60.

In this manner, the first pump circuit 60 ceases its operation when CLKG11S falls at p2. Similarly, a second pump circuit 60 ceases its operation when CLKG12S falls at r3, a third pump circuit 60 ceases its operation when CLKG13S falls at t2, a fourth pump circuit 60 ceases its operation when CLKG14S falls at w2, and a fifth pump circuit 60 ceases its operation when CLKG15S falls at y2. An i'th pump circuit 60 ceases its operation only when CLKG1iS falls. Since clocks CLKG1iS are different in phase from each other, the five pump circuits 60 cease their operations at different times. Also, the i'th pump circuit 60 restarts voltage boosting only when CLKG1iS falls, and therefore the five pump circuits 60 restart voltage boosting at different times.

In the conventional booster circuit, when the level of a clock enable signal CP_EN is changed to "L", four-phase clocks to be supplied to pump circuits are simultaneously held in a predetermined state regardless of the states of the pump circuits. Accordingly, in the conventional booster circuit, when voltage boosting is ceased or restarted, it is often that the flow of current is larger than the flow of a peak current during operation. On the other hand, in the booster circuit according to the present embodiment, due to the action of the four-phase clock transfer control circuits 50, a plurality of pump circuits 60 included in each booster block cease or restart voltage boosting at different times. Thus, with the booster circuit according to the present embodiment, it is possible to prevent the flow of current becoming larger than the flow of a peak current during operation when the voltage boosting is ceased or restarted.

Also, in the conventional booster circuit (FIG. 16), the pump circuits 69 are directly controlled based on a clock enable signal CP_EN outputted from the detection circuit 70. Accordingly, in order to generate a plurality of boosted voltages, the booster circuit is required to include the oscillation circuit 10 and the four-phase clock generation circuit 29 for each boosted voltage. On the other hand, in the booster circuit according to the present embodiment, the four-phase clock transfer control circuits 50a are controlled based on a clock enable signal CP_EN outputted from the detection circuit 70, so that the pump circuits 60 are indirectly controlled. Accordingly, even in the case of generating a plurality of boosted voltages, the booster circuit is required to include only one oscillation circuit 10 and the four-phase clock generation circuits 20 equal in number to the pump circuits 60 included in one booster block. Thus, it is possible to reduce the size of the booster circuit.

The above-described four-phase clock transfer control circuits 50a are suitable for a booster circuit in which, for example, a set of four-phase clocks 200 are supplied to one pump circuit 60, and therefore transfer control of the four-phase clocks 200 is required only once per cycle of the oscillation clock 100. However, if the four-phase clock transfer control circuits 50a are used in a booster circuit in which a set of four-phase clocks 200 are supplied to two pump circuits, inefficiency as described below might occur in association with the range of ripple in a boosted voltage.

In a booster circuit in which a set of four-phase clocks 200 are supplied to two pump circuits, the two pump circuits separately perform voltage boosting in a period for which the level of CLKG1iS is "H" and in a period for which the level of CLKG2iS is "H". Accordingly, in a period from the time the level of a clock enable signal CP_EN is changed to "L" until the time the level of a clock activation signal CP_ACT_EN is changed to "L", at worst, CLKG1iS and CLKG2iS each become "H" level at one time. Therefore, even if an attempt is made to cause the pump circuits 60 to cease immediately when the level of CP_EN is changed to "L", a clock pulse of CLKG1iS and a clock pulse of CLKG2iS are inputted to each of the pump circuits 60, and at worst, the pump circuits 60 each perform voltage boosting at two times, for example, where the level of CP_EN is changed to "L" immediately after the fail of CLKG1iS. For example, as shown in section E of FIG. 12, when the level of CP_EN is changed to "L", it is ideal to immediately stop the supply of clock pulses to each of the pump circuits 60. In actuality, however, as shown in section G of FIG. 12, a clock pulse of CLKG12C at r3 and a clock pulse of CLKG22C at s2 are supplied to a second pump circuit 60. Accordingly, excessive clock pulses are supplied to the pump circuits 60 after the level of CP_EN is changed to "L", so that the level of a voltage Pout1 considerably exceeds the level of a target voltage, and a specified range of ripple in a boosted voltage is exceeded.

Accordingly, if it is necessary to control boosted voltages with higher accuracy, it is preferable to use, for example, four-phase clock transfer control circuits 50b as shown in FIG. 7. The four-phase clock transfer control circuits 50b perform switching to transfer the four-phase clocks 200 at a plurality of times (specifically, two times) per cycle of the oscillation clock 100.

Figure 13:
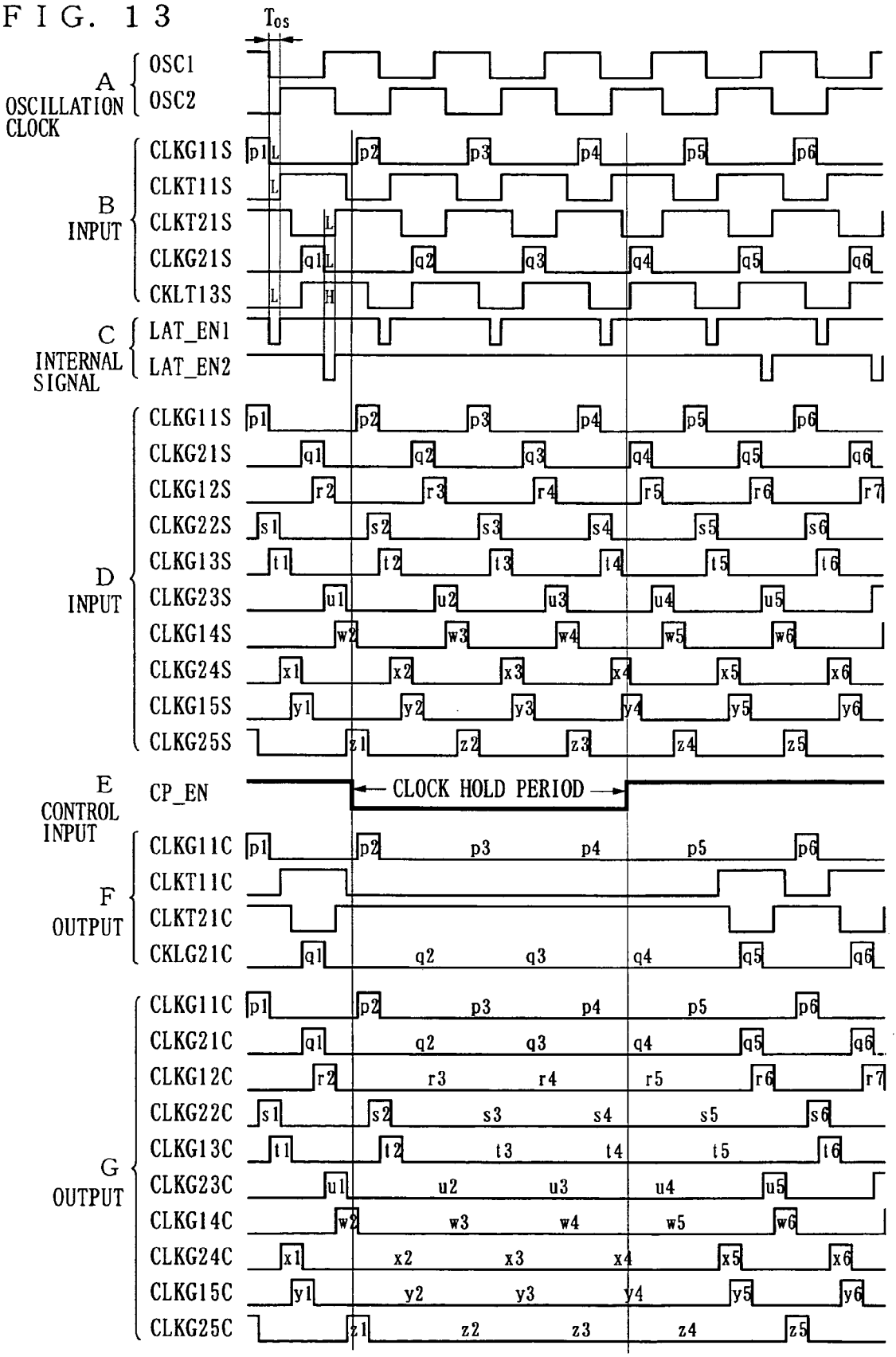
FIG. 13 is a timing chart for the four-phase clock transfer control circuit shown in FIG. 7.

Hereinbelow, referring to FIGS. 13-15, the four-phase clock transfer control circuits 50b (FIG. 7) are described with respect to a case where n is 5. FIG. 13 is a timing chart for the four-phase clock transfer control circuits 50b. In FIG. 13, sections A, B, and D through F are the same as those shown in FIG. 12. Section G in FIG. 12 and section G in FIG. 13 differ from each other in that the former shows a clock pulse of CLKG12C at r3, a clock pulse of CLKG15C at y2, a clock pulse of CLKG22C at s5, and a clock pulse of CLKG25C at z4, while the latter shows none of these four clock pulses. An i'th four-phase clock transfer control circuit 50b receives seven signals, i.e., four clocks CLKG1iS, CLKT1iS, CLKT2iS, and CLKG2iS generated by an i'th four-phase clock generation circuit 20, CLKT1 (i+2) S caused to be delayed from CLKT1iS by 2×Tos; a clock enable signal CP_EN outputted from the detection circuit 70; and a resetting signal RST_EN.

As described below, in each of the four-phase clock transfer control circuits 50b, when reset is off (i.e., the resetting signal RST_EN is at "L" level), and a first clock enable signal CP_EN_A1 outputted from the latch circuit 52 and a second clock enable signal CP_EN_A2 outputted from the latch circuit 57 are all at "H" level, the four-phase clocks 200 are transferred to a corresponding one of the pump circuits 60.

The level of the first latch enable signal LAT_EN1 is changed from "H" to "L" when CLKG1iS, CLKT1iS, and CLKT1 (i+2) S all become "L" level, and the level of the second latch enable signal LAT_EN2 is changed from "H" to "L" when CLKG2iS, CLKT2iS, and CLKT1 (i+2) S become "L", "L", and "H" levels, respectively. However, due to the action of the NAND gates 54 and 55, the level of LAT_EN1 is changed only when the level of CP_EN_A2 is at "H", and the level of LAT_EN2 is changed only when the level of CP_EN_A1 is "H".

When the level of LAT_EN1 is changed from "H" to "L", the latch circuit 51 latches the clock enable signal CP_EN. The state where the level of LAT_EN1 is "L" lasts for a period of time Tos. When the level of LAT_EN1 is changed from "L" to "H", the latch circuit 52 holds output Q of the latch circuit 51. In this manner, the level of CP_EN is sequentially latched by the latch circuit 51 and the latch circuit 52. Similarly, the level of CP_EN is sequentially latched by the latch circuit 56 and the latch circuit 57.

Accordingly, while the level of CP_EN is "H", CP_EN_A1 and CP_EN_A2 are both at "H" level, and accordingly, the level of clock activation signal CP_ACT_EN is "H". When the level of CP_ACT_EN is "H", the clock mask circuit 59 outputs, as CLKG1iC, CLKT1iC, CLKT2iC, and CLKG2iC, inputted clocks CLKG1iS, CLKT1iS, CLKT2iS, and CLKG2iS without being processed. In this manner, while the level of CP_ACT_EN is "H", the four-phase clocks 200 generated by the four-phase clock generation circuits 20 are transferred to the pump circuits 60.

Figure 14:
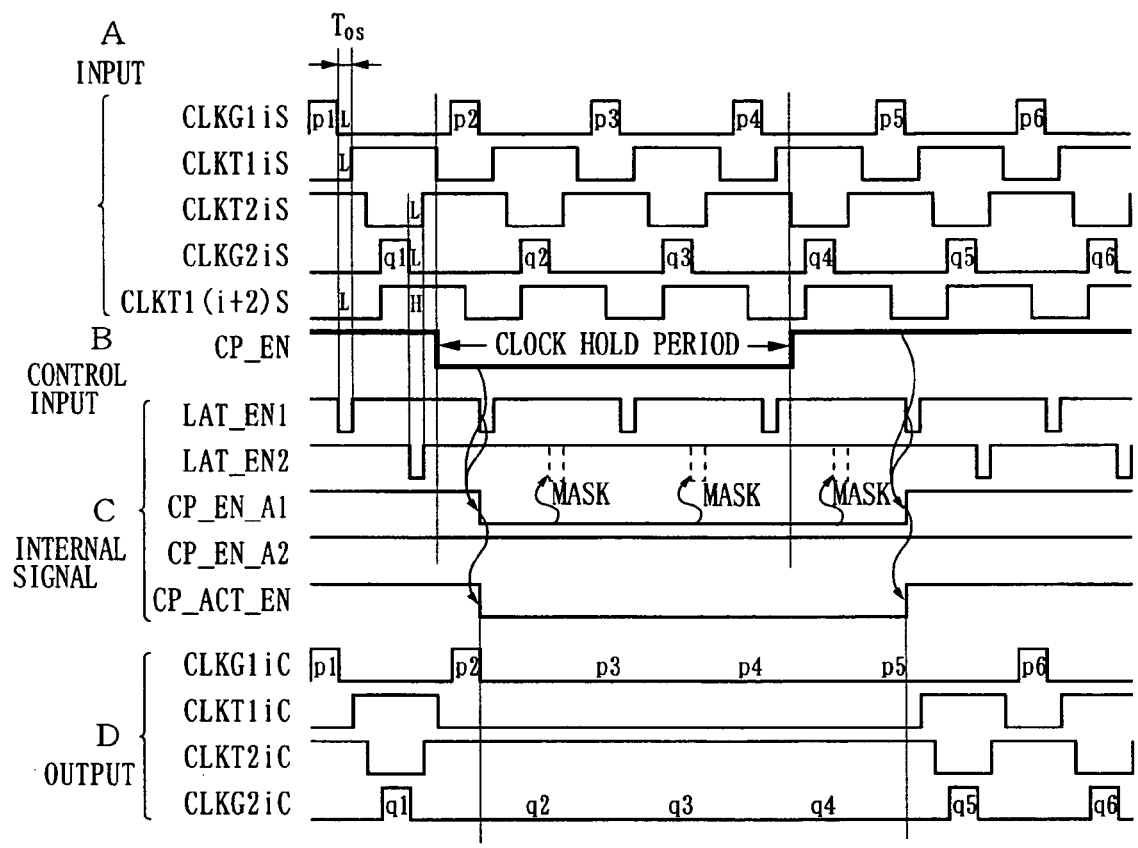
FIG. 14 is a timing chart illustrating a case where the four-phase clock transfer control circuit shown in FIG. 7 ceases the transfer of four-phase clocks at a first time point.

FIG. 14 is a timing chart for a case where the transfer of the four-phase clocks 200 is ceased after the fall of CLKG1iS. In a period from the fall of CLKG2iS to the fall of CLKG1iS, if the level of CP_EN is changed from "H" to "L", the level of LAT_EN1 is changed to "L" when CLKG1iS, CLKT1iS, and CLKT1 (i+2) S all become "L" level (upon the fall of CLKG1iS at p2 in FIG. 14). Subsequently (after a lapse of a period of time Tos), when the level of LAT_EN1 is changed to "H", the level of CP_EN_A1 is changed to "L", and substantially at the same time, the level of CP_ACT_EN is also changed to "L". Since the latch circuit 58 latches CLKT1 (i+2) S when the level of CP_ACT_EN is changed to "L", the output level of the latch circuit 58 becomes "L".

While the output level of the latch circuit 58 is "L", and the level of CP_ACT_EN is "L", the clock mask circuit 59 holds CLKG1iC, CLKT1iC, CLKT2iC, and CLKG2iC at the same levels as those of CLKG1iS, CLKT1iS, CLKT2iS, and CLKG2iS, respectively, when the level of LAT_EN1 has been changed to "L" (specifically, they are held at "L", "L", "H", and "L" levels, respectively). In this manner, while the level of CP_ACT_EN is "L", the four-phase clocks 200 generated by the four-phase clock generation circuits 20 are not transferred to the pump circuits 60. Note that while the level of LAT_EN1 is "L", the level of LAT_EN2 is held at "H" due to the action of the NAND gate 55. In section C of FIG. 14, it is shown how CP_EN_A1 masks LAT_EN2 at "H" level.

Thereafter, when the level of CP_EN is changed from "L" to "H", and subsequently CLKG1iS, CLKT1iS, and CLKT1 (i+2) S all become "L" level (upon the fall of CLKG1iS at p5 in FIG. 14), the level of LAT_EN1 is changed to "L". Subsequently (after a lapse of a period of time Tos), when the level of LAT_EN1 is changed to "H", the level of CP_EN_A1 is changed to "H", and substantially at the same time, the level of CP_ACT_EN is also changed to "H". After the level of CP_ACT_EN is changed to "H", the four-phase clocks 200 generated by the four-phase clock generation circuits 20 are again transferred to the pump circuits 60 (in section D of FIG. 14, it is shown how clock pulses of CLKG1iC at and after p6 and clock pulses of CLKG2iC at and after q5 are transferred). In this manner, the four-phase clock transfer control circuits 50b restart the transfer of the four-phase clocks 200 generated by the four-phase clock generation circuits 20 after the four-phase clocks 200 become the same levels at the time of the ceasing of transfer. Thus, it is possible to maintain the continuity of four-phase clocks to be supplied to the pump circuits 60.

Figure 15:
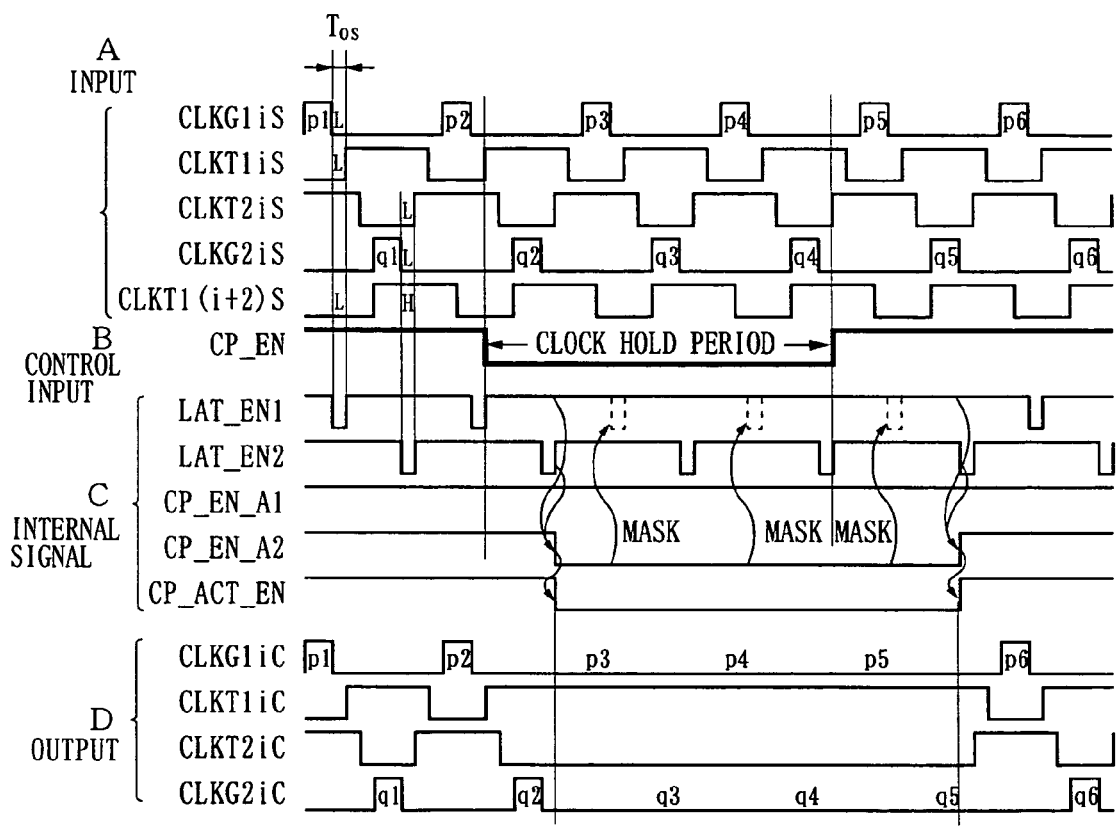
FIG. 15 is a timing chart illustrating a case where the four-phase clock transfer control circuit shown in FIG. 7 ceases the transfer of four-phase clocks at a second time point.

FIG. 15 is a timing chart for a case where the transfer of the four-phase clocks 200 are ceased after the fall of CLKG2iS. In this case, the operation of the four-phase clock transfer control circuits 50b is substantially the same as the above-described operation of ceasing the transfer of the four-phase clocks 200 after the fall of CLKG1iS. Specifically, in a period from the fall of CLKG1iS to the fall of CLKG2iS, when the level of CP_EN is changed from "H" to "L", and subsequently, when CLKG2iS and CLKT2iS become "L" level, and CLKT1 (i+2) S becomes "H" level (upon the fall of CLKG2iS at q2 in FIG. 15), the level of LAT_EN2 is changed to "L". Subsequently (after a lapse of a period of time Tos), when the level of LAT_EN2 is changed to "H", the level of CP_EN_A2 is changed to "L", and substantially at the same time, the level of CP_ACT_EN is changed to "L". Since the latch circuit 58 latches CLKT1 (i+2) S when the level of CP_ACT_EN is changed to "L", the output level of the latch circuit 58 becomes "H".

While the output level of the latch circuit 58 is "H", and the level of CP_ACT_EN is "L", the clock mask circuit 59 holds CLKG1iC, CLKT1iC, CLKT2iC, and CLKG2iC at the same levels as those of CLKG1iS, CLKT1iS, CLKT2iS, and CLKG2iS, respectively, when the level of LAT_EN2 has been changed to "L" (specifically, they are "L", "H", "L", and "L"

levels, respectively). Note that while the level of LAT_EN2 is "L", the level of LAT_EN1 is held at "H" due to the action of the NAND gate 54. In section C of FIG. 15, it is shown how CP_EN_A2 masks LAT_EN1 at "H" level.

Thereafter, when the level of CP_EN is changed from "L" to "H", and subsequently, when CLKT2iS and CLKG2iS become "L" level, and CLKT1 (i+2) S becomes "H" level (upon the fall of CLKG2iS at q5 in FIG. 15), the level of LAT_EN2 is changed to "L". Subsequently (after a lapse of a period of time Tos), when the level of LAT_EN2 is changed to "H", the level of CP_EN_A2 is changed to "H", and substantially at the same time, the level of CP_ACT_EN is also changed to "H". After the level of CP_ACT_EN is changed to "H", the four-phase clocks 200 generated by the four-phase clock generation circuits 20 are again transferred to the pump circuits 60 (insection D of FIG. 15, it is shown how clock pulses of CLKG1iC at and after p6 and clock pulses of CLKG2iC at and after q6 are transferred). In this manner, the four-phase clock transfer control circuits 50b restart the transfer of the four-phase clocks 200 generated by the four-phase clock generation circuits 20 when the four-phase clocks 200 become the same levels at the time of the ceasing of transfer. Thus, it is possible to maintain the continuity of four-phase clocks to be supplied to the pump circuits 60.

As described above, in the first-described booster circuit including the four-phase clock transfer control circuits 50a (FIG. 6), there is a possibility that the pump circuits 60 might operate two times after the level of clock enable signal CP_EN is changed to "L", whereas in the latter-described booster circuit including the four-phase clock transfer control circuits 50b (FIG. 7), the pump circuits 60 operate only at most once after the level of clock enable signal CP_EN is changed to "L". Accordingly, with the latter booster circuit, it is possible to suppress the amount of boosted voltage which overshoots the level of a target voltage, thereby reducing the range of ripple in the boosted voltage.

Figure 18A:
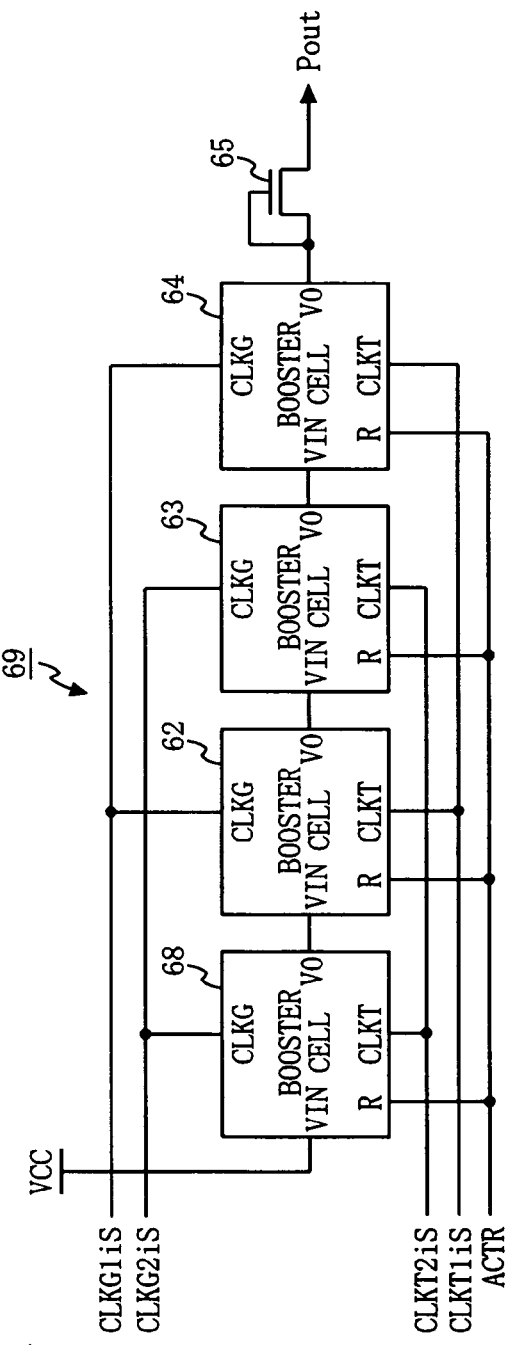
FIGS. 18A and 18B are diagrams each illustrating an exemplary configuration of a pump circuit included in a conventional booster circuit.
Figure 18B:
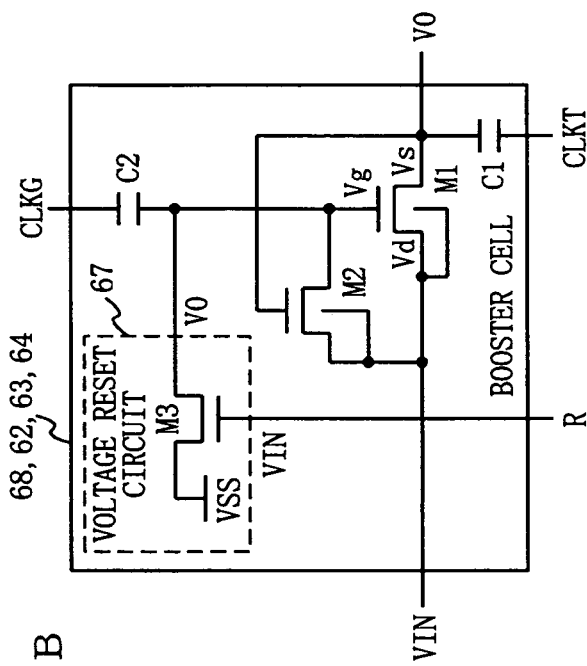
Figure 19:
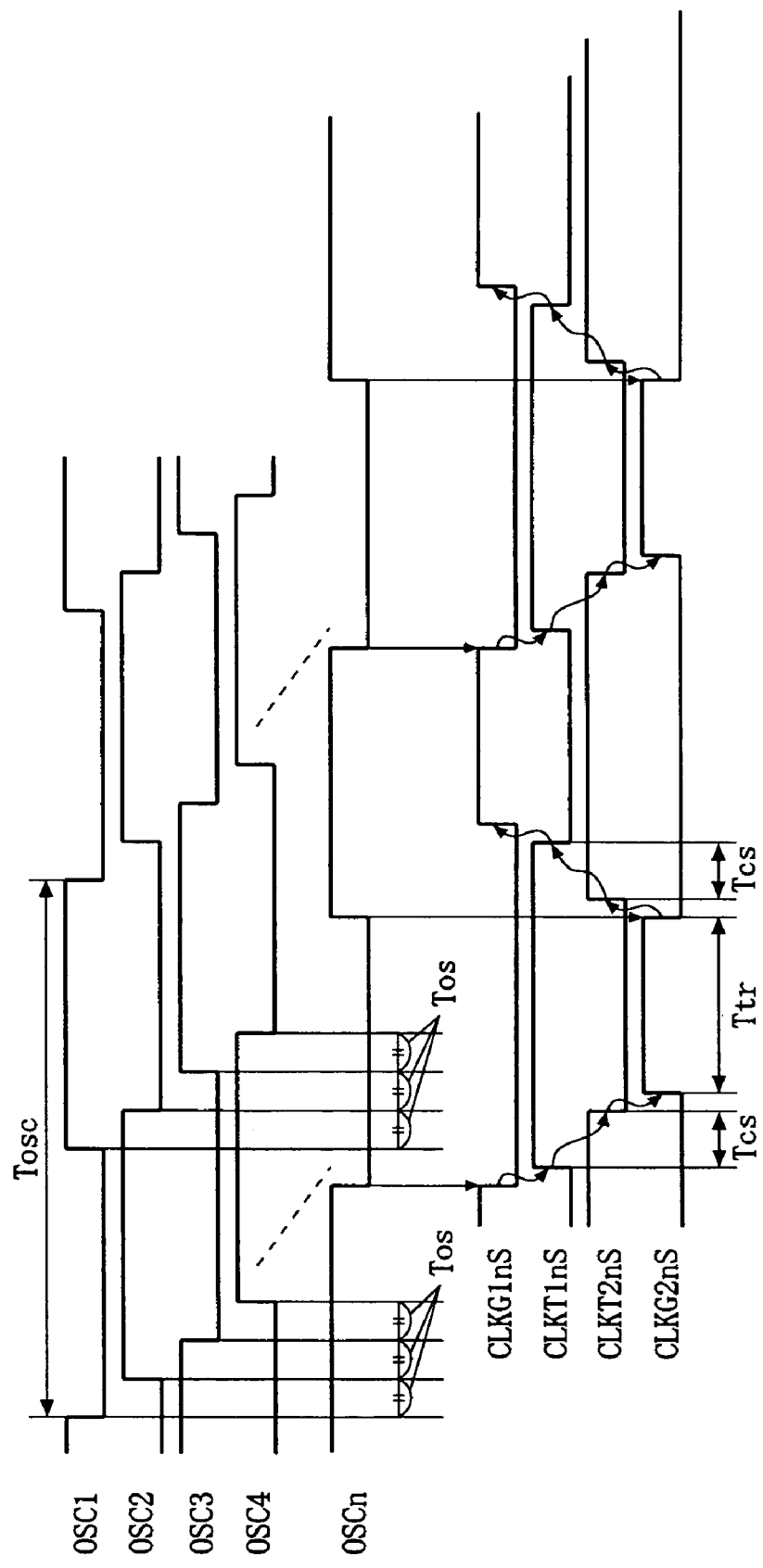
FIG. 19 is a timing chart for the four-phase clock generation circuit shown in FIG. 17.

Next, the details of the pump circuits 60 are described with reference to FIGS. 8A-8C. The pump circuits 60 boost a power supply voltage based on the same principle as the pump circuits 69 included in the conventional booster circuit (FIG. 18). Accordingly, the description of voltage boosting by the pump circuits 60 is omitted here, and only the first-stage booster cell 61, which is a characteristic feature of the pump circuits 60 of the present embodiment, is described. As described above, among the four booster cells 61-64 included in each pump circuit 60, the first-stage booster cell 61 is a booster cell of a type as shown in FIG. 8B, and the other booster cells 62-64 are booster cells of a type as shown in FIG. 8C.

The booster cells 61-64 each receive a voltage resetting signal ACTR from a control circuit (not shown) provided external to the pump circuit 60. When the voltage resetting signal ACTR is inactive ("L"), the output level of the inverter 66 is "H", and a power supply voltage VCC is applied to the VINC terminal of the booster cell 61.

Now, consider a case where, when the voltage resetting signal ACTR is inactive and the pump circuit 60 is performing voltage boosting, the target voltage is suddenly shifted from high level to low level. In this case, as in the conventional pump circuits 69 (FIGS. 18A and 18B), the pump circuit 60 might encounter a problem where the charge transfer transistor M1 is brought into a constant conductive state. Accordingly, in order to prevent this problem, the voltage resetting signal ACTR is set so as to be active ("H") for a predetermined period of time when the level of the voltage setting signal ACTH is changed.

When the voltage resetting signal ACTR is set to "H" level, the output level of the inverter 66 becomes "L" level, and the VINC terminal of the booster cell 61 is coupled to a ground voltage. As a result, the drain terminal, source terminal, and P-well of the switch transistor M2 included in the booster cell 61 are all coupled to the ground voltage, so that no stationary current is applied to the switch transistor M2. Also, a gate voltage of the charge transfer transistor M1 is equal to the ground voltage, and therefore even if the power supply voltage VCC is applied to the VIN terminal, no current flows from the VIN terminal to the VO terminal. Also, the ground voltage is applied to the P-well of the charge transfer transistor M1, and therefore no current flows to the drain terminal (i.e., the VIN terminal of the booster cell 61) or source terminal (i.e., the VO terminal of the booster cell 61) of the charge transfer transistor M1 because there are no forward-biased PN junctions. Accordingly, even if the voltage reset circuit 67 is activated, no stationary current flows.

After the completion of reset, when the state of the voltage resetting signal ACTR is changed from active ("H") to inactive ("L"), the NMOS transistor M3 becomes nonconductive, and the power supply voltage VCC is applied to the VINC terminal. Accordingly, even if, thereafter, the gate voltage of the charge transfer transistor M1 is gradually boosted, no boosted charge is lost, and therefore the pump circuit 60 can normally perform voltage boosting. As such, similar to the conventional pump circuits 69, the pump circuit 60 can be used for preventing the problem where the charge transfer transistor M1 is brought into a constant conductive state.

As described above, in the booster circuit including the pump circuits 60, no stationary current flows even by activating the voltage reset circuits 67 while the pump circuits 60 are not activated. Accordingly, it is not necessary to control the time in which the voltage resetting signal ACTR is active, and therefore, no time control circuit is required for such control. Thus, it is possible to reduce the circuit size of the booster circuit.

Next, the boost-assist circuit 80 is described in detail with reference to FIGS. 9 and 10. As described above, the boost-assist circuit 80 is a circuit in which current flows only in a direction from IN terminal to OUT terminal, and the circuit is provided between the output terminal of the first booster block 41 and the output terminal of the second booster block 42. If a voltage Pout2 is higher than a voltage Pout1, the IN terminal of the boost-assist circuit 80 is coupled to the output terminal of the first booster block 41, and the OUT terminal of the boost-assist circuit 80 is coupled to the output terminal of the second booster block 42.

When the voltage Pout1 and the voltage Pout2 simultaneously rise, the rise of the voltage Pout2 is slower than the rise of the voltage Pout1 if the booster circuit is not provided with any specialized function. Accordingly, the booster circuit as shown in FIG. 1 includes the boost-assist circuit 80 in order to reduce the rise time of the voltage Pout2. Until the voltage Pout1 reaches the level of a target voltage, the voltage Pout1 rises faster than the voltage Pout2. Up to this time point, in the boost-assist circuit 80, current flows in a direction from IN terminal to OUT terminal, i.e., in a direction from the output terminal of the first booster block 41 to the output terminal of the second booster block 42. Therefore, until the voltage Pout1 reaches the target voltage level, the voltage Pout2 rises faster with the assistance of the boost-assist circuit 80 compared to a case without assistance.

The voltage Pout1 does not rise after it reaches the target voltage level. On the other hand, the voltage Pout2 continues to rise with the assistance to become equal to the voltage Pout1, and further continues to rise. However, in the boost-assist circuit 80, no current flows in a direction from OUT terminal to IN terminal, and therefore no current flows to the boost-assist circuit 80 after the voltage Pout2 exceeds the voltage Pout1. Accordingly, after the voltage Pout2 exceeds the voltage Pout1, the boost-assist circuit 80 does not affect either the voltage Pout1 or the voltage Pout2.

As described above, while a boosted voltage on the side of a relatively high target voltage is lower than a boosted voltage on the side of a relatively low target voltage, the boost-assist circuit 80 assists the rise of the boosted voltage on the side of a relatively high target voltage, and the boost-assist circuit 80 does not affect the boosted voltages after the relationship between their levels is reversed. Thus, with the booster circuit including the boost-assist circuit 80, it is possible to reduce the rise time of the boosted voltage on the side of a relatively high target voltage.

The boost-assist circuit 80 is a circuit of a type as shown in FIG. 9 or 10, for example. As described above, the N-channel transistor 81 included in the boost-assist circuit 80a shown in FIG. 9 acts as a diode which causes current to flow through the boost-assist circuit 80a only in a direction from IN terminal to OUT terminal. More specifically, while the voltage level at the IN terminal is higher than the voltage level at the OUT terminal, current flows in a direction from IN terminal to OUT terminal. Where the voltage level at the IN terminal is Vin, the voltage level at the OUT terminal is Vout, and a threshold voltage of the N-channel transistor 81 is Vt, a voltage Vout rises up to (Vin-Vt).

In the boost-assist circuit 80a, however, the bulk (denoted by B in FIG. 9) of the N-channel transistor 81 is coupled to a ground voltage. Accordingly, when the voltage Vin rises, the threshold voltage Vt also rise due to the substrate bias effect, so that the maximum voltage level of the voltage Vout is reduced. Accordingly, after the voltage Pout2 (i.e., the voltage at the OUT terminal) outputted from the second booster block 42 exceeds the voltage Pout1 (i.e., the voltage at the IN terminal) outputted from the first booster block 41, no current flows to the N-channel transistor 81. Thus, it is possible to realize a complete off state.

As described above, the booster circuit including the boost-assist circuit 80a causes current to flow therethrough to assist the rise of the voltage at the OUT terminal while the voltage level at the IN terminal is higher than the voltage level at the OUT terminal, and after the relationship between the voltage levels is reversed, a complete OFF state can be achieved.

Next, the boost-assist circuit 80b shown in FIG. 10 is described in detail. When the voltage level at the IN terminal is higher than the voltage level at the OUT terminal, the drain voltage of the N-channel transistor 84 is lower than the gate voltage thereof, and therefore the N-channel transistor 84 becomes conductive, so that the voltage at the OUT terminal is applied to a well node. Also, in the N-channel transistor 83, the gate voltage and the source voltage become substantially equal to each other, so that the drain voltage becomes higher than both the gate voltage and the source voltage, so that the N-channel transistor 83 is brought into an OFF state. As a result, the voltage level at the well node becomes equal to the voltage level at the OUT terminal.

On the other hand, after the voltage at the OUT terminal becomes higher than the voltage at the IN terminal, the gate voltage of the N-channel transistor 83 is lower than the drain voltage thereof, and therefore the N-channel transistor 83 becomes conductive, so that the voltage at the IN terminal is applied to the well node. Also, in the N-channel transistor 84, the gate voltage and the source voltage become substantially equal to each other, and therefore the drain voltage becomes higher than both the gate voltage and the source voltage, so that the N-channel transistor 84 is brought into an OFF state. Accordingly, the voltage level at the well node becomes equal to the voltage level at the IN terminal.

As described above, the voltage level at the well node becomes equal to a lower one of the voltage level at the IN terminal and the voltage level at the OUT terminal. Since the lower one of the voltage level at the IN terminal and the voltage level of the OUT terminal is applied to the well node of the N-channel transistor 82, it is possible to suppress the occurrence of the substrate bias effect even if the voltage level at the IN terminal is higher than the voltage level at the OUT terminal. Also, after the voltage level at the OUT terminal becomes higher than the voltage level at the IN terminal, no current flows because there are no forward-biased PN junctions, and therefore it is possible to achieve a complete OFF state.

As such, the booster circuit including the boost-assist circuit 80b achieves an effect similar to that achieved by the booster circuit including the boost-assist circuit 80a. Moreover, with the booster circuit including the boost-assist circuit 80b, even if the voltage level at the IN terminal is lower than the voltage level at the OUT terminal, it is possible to suppress the occurrence of the substrate bias effect, and efficiently assist the rise of the voltage at the OUT terminal.

There are possible variations of the above-described booster circuit according to the present embodiment. For example, the booster circuit may include three or more booster blocks. Also, the four-phase clock voltage control circuits and the pump circuits, which are included in each booster block, may be different in number from each other, and the numbers thereof may be smaller than the number of four-phase clock generation circuits. Also, the pump circuits 60 may be driven by multiphase clocks other than four-phase clocks. Also, exemplary configurations have been described for each circuit included in a booster circuit with reference to FIGS. 2-9, the circuits configurations are merely illustrative and circuits other than those illustrated can be used.

The booster circuit of present invention has characteristic features, such as small circuit size, high operation efficiency, low current consumption, etc., and therefore can be advantageously used in a nonvolatile memory, such as a flash EEPROM, or a microcomputer including such a nonvolatile memory.

While the invention has been described in detail, the foregoing description is in all aspects illustrative and not restrictive. It is understood that numerous other modifications and variations can be devised without departing from the scope of the invention.

What is claimed is:

1. A booster circuit operating based on a multiphase clock, comprising:

an oscillation circuit for outputting sets of a plurality of oscillation clocks different in phase from each other and providing a set of plurality of source oscillation clocks different in phase from each other for each of multiphase clock generation circuits;

said each of multiphase clock generation circuits for generating the multiphase clock based on the set of a plurality of source oscillation clocks different in phase from each other;

a pump circuit for generating a boosted voltage based on the multiphase clock;

a multiphase clock transfer control circuit for controlling whether to transfer the multiphase clock from the multiphase clock generation circuit to the pump circuit in accordance with a control signal; and a detection circuit for comparing the boosted voltage generated in the pump circuit with a predetermined target voltage, and outputting the control signal to said multiphase clock transfer control circuit, wherein when the multiphase clock transfer control circuit ceases to transfer the multiphase clock, the multiphase clock is held at a value taken at a time of ceasing transfer of the multiphase clock, and the multiphase clock transfer control circuit restarts transferring the multiphase clock when the multiphase clock generated by the multiphase clock generation circuit takes the value taken at a time of ceasing to be transferred.

2. The booster circuit according to claim 1, wherein the multiphase clock transfer control circuit includes:

a plurality of control signal storage circuits for storing, for each cycle of the multiphase clock, values of the control signal at different times;

a timing storage circuit for storing a time at which any value stored in the control signal storage circuit has been changed from the first value to the second value; and a clock mask circuit for passing the multiphase clock when the values stored in the control signal storage circuit are all equal to the first value, and holding the multiphase clock at a predetermined value in accordance with the time stored in the timing storage circuit when otherwise.

3. A booster circuit operating based on a multiphase clock, comprising:

an oscillation circuit for outputting sets of a plurality of oscillation clocks different in phase from each other and providing a set of a plurality of source oscillation clocks different in phase from each other for each of multiphase clock generation circuits;

said each of multiphase clock generation circuits for generating the multiphase clock based on the set of a plurality of source oscillation clocks different in phase from each other; and a plurality of pump circuits for generating a plurality of boosted voltages different in level from each other based on the multiphase clock;

a multiphase clock transfer control circuit for controlling whether to transfer the multiphase clock from the multiphase clock generation circuit to the pump circuit in accordance with a control signal; and a detection circuit for comparing the boosted voltage generated in the pump circuit with a predetermined target voltage, and outputting the control signal to said multiphase clock transfer control circuit, wherein when the multiphase clock transfer control circuit ceases to transfer the multiphase clock, the multiphase clock is held at a value taken at a time of ceasing transfer of the multiphase clock, and the multiphase clock transfer control circuit restarts transferring the multiphase clock when the multiphase clock generated by the multiphase clock generation circuit takes the value taken at a time of ceasing to be transferred.

4. The booster circuit according to claim 3, further comprising a multiphase clock delay circuit for delaying the multiphase clock, wherein the plurality of pump circuits are supplied with multiphase clocks which are caused to be delayed by different time periods by the multiphase clock delay circuit.

5. The booster circuit according to claim 3, further comprising a boost-assist circuit for causing a current to flow between output terminals of the plurality of pump circuits only in a predetermined direction.

6. A booster circuit operating based on a multiphase clock, comprising an oscillation circuit for outputting a plurality of oscillation clocks different in phase from each other;

a multiphase clock generation circuit for generating the multiphase clock based on the plurality of oscillation clocks; and a pump circuit for generating a boosted voltage based on the multiphase clock, wherein the pump circuit includes a plurality of stages of booster cells connected in series with each other, wherein the plurality of booster cells each include:

a charge transfer transistor for transferring an output voltage from a circuit in the booster cell in a previous stage to a circuit in the booster cell in a next stage;

an output voltage boosting capacitor having a first electrode connected to an output terminal of the charge transfer transistor and a second electrode to which a first clock contained in the multiphase clock is supplied;

a gate voltage boosting capacitor having a first electrode connected to a gate terminal of the charge transfer transistor and a second electrode to which a second clock contained in the multiphase clock;

a switch transistor for performing switching to couple an input terminal of the charge transfer transistor to a gate terminal thereof; and a voltage reset circuit for resetting a gate voltage of the charge transfer transistor to a predetermined voltage level in accordance with a given reset control signal, and wherein in a booster cell in a first stage, an inverted signal of the reset control signal is applied to a well of the charge transfer transistor and a well of the switch transistor, and in a booster cell in any stage other than the first stage, the output voltage of the circuit in the previous stage is applied to a well of the charge transfer transistor and a well of the switch transistor.

7. A booster circuit operating based on a multiphase clock, comprising:

an oscillation circuit for outputting sets of a plurality of oscillation clocks different in phase from each other and providing a set of plurality of source oscillation clocks different in phase from each other for each of multiphase clock generating circuits;

said each of multiphase clock generation circuits for generating the multiphase clock based on the set of a plurality of source oscillation clocks different in phase from each other; and a pump circuit for generation a boosted voltage based on the multiphase clock;

a multiphase clock transfer control circuit for controlling whether to transfer the multiphase clock from the multiphase clock generation circuit to the pump circuit in accordance with a control signal; and a detection circuit for comparing the boosted voltage generated in the pump circuit with a predetermined target voltage, and outputting the control signal to said multiphase clock transfer control circuit.

* * * * *